(12) United States Patent
Takata et al.

(10) Patent No.: US 8,218,769 B2
(45) Date of Patent: Jul. 10, 2012

(54) ENCRYPTED COMMUNICATION SYSTEM, COMMUNICATION STATUS MANAGEMENT SERVER, ENCRYPTED COMMUNICATION METHOD, AND COMMUNICATION STATUS MANAGEMENT METHOD

(75) Inventors: Osamu Takata, London (GB); Tadashi Kaji, Yokohama (JP); Takahiro Fujishiro, Yokohama (JP); Kazuyoshi Hoshino, Tokyo (JP); Keisuke Takeuchi, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 921 days.

(21) Appl. No.: 11/711,892

(22) Filed: Feb. 28, 2007

(65) Prior Publication Data
US 2007/0274525 A1    Nov. 29, 2007

(30) Foreign Application Priority Data
Feb. 28, 2006    (JP) .................................. 2006-52361

(51) Int. Cl.
*H04K 1/00*    (2006.01)
(52) U.S. Cl. ........ 380/270; 380/247; 380/272; 380/277; 380/45; 726/5; 713/150; 713/161; 713/163
(58) Field of Classification Search .................. 380/270, 380/279, 28, 44; 713/163
See application file for complete search history.

(56) References Cited

U.S. PATENT DOCUMENTS

| | | | |
|---|---|---|---|
| 6,195,751 B1 | 2/2001 | Caronni et al. | |
| 7,027,803 B2 * | 4/2006 | Dafcik | 455/414.1 |
| 7,400,732 B2 * | 7/2008 | Staddon et al. | 380/278 |
| 7,599,496 B2 * | 10/2009 | Hengeveld et al. | 380/278 |
| 7,681,194 B2 * | 3/2010 | Van Ee et al. | 718/100 |
| 8,069,470 B1 * | 11/2011 | Montenegro | 726/3 |
| 2002/0138722 A1 * | 9/2002 | Douceur et al. | 713/153 |
| 2002/0154781 A1 * | 10/2002 | Sowa et al. | 380/278 |
| 2003/0044020 A1 * | 3/2003 | Aboba et al. | 380/278 |
| 2003/0172165 A1 * | 9/2003 | Xu et al. | 709/228 |
| 2004/0054891 A1 * | 3/2004 | Hengeveld et al. | 713/163 |
| 2005/0149759 A1 * | 7/2005 | Vishwanath et al. | 713/201 |
| 2005/0182818 A1 * | 8/2005 | Kawamoto et al. | 709/204 |

(Continued)

FOREIGN PATENT DOCUMENTS

CN    1292185    4/2001

(Continued)

OTHER PUBLICATIONS

Hardjono, et al., "RFC 3740—The Multicast Group Security Architecture", Network Working Group, Mar. 2004, The Internet Society, <http://www.faqs.org/rfcs/rfc3740.html>.

(Continued)

*Primary Examiner* — Nathan Flynn
*Assistant Examiner* — Viral Lakhia
(74) *Attorney, Agent, or Firm* — McDermott Will & Emery LLP

(57) ABSTRACT

An encrypted communication system is provided, in which an encryption key for use in encrypted communication and settings information for the encrypted communication are distributed to each of a plurality of communication devices performing encrypted communication within a group, and in which traffic generated by distributing the encryption key and the like can be reduced. In the encrypted communication system according to the present invention, information including a key for use in the intra-group encrypted communication or a seed which generates the key is distributed to the communication devices belonging to the group that are participating (e.g., logged in) in the intra-group encrypted communication.

12 Claims, 17 Drawing Sheets

U.S. PATENT DOCUMENTS

| | | | |
|---|---|---|---|
| 2005/0226424 A1 | 10/2005 | Takata et al. | |
| 2006/0029093 A1* | 2/2006 | Van Rossum | 370/432 |
| 2006/0272021 A1* | 11/2006 | Marinescu et al. | 726/24 |
| 2007/0123287 A1* | 5/2007 | Mock et al. | 455/518 |
| 2007/0263875 A1 | 11/2007 | Kitaya et al. | |
| 2008/0101611 A1* | 5/2008 | Lindholm et al. | 380/277 |
| 2008/0205655 A1* | 8/2008 | Wilkins et al. | 380/279 |
| 2009/0034738 A1* | 2/2009 | Starrett | 380/278 |

FOREIGN PATENT DOCUMENTS

| | | |
|---|---|---|
| CN | 1389042 | 1/2003 |
| EP | 1 087 566 A2 | 3/2001 |
| JP | 2004-23237 A | 1/2004 |
| JP | 2005-303485 | 10/2005 |
| JP | 2005-304093 | 10/2005 |
| WO | WO 99/37052 | 7/1999 |
| WO | WO 2005/109735 A1 | 11/2005 |

OTHER PUBLICATIONS

Hardjono, T., et al., "The Muticast Group Security Architecture", IETF Standard, Internet Engineering Task Force, XP015009520, Mar. 2004, pp. 1-26, IETF.

European Search Report issued in European Patent Application No. EP 07 00 3896, dated Jun. 18, 2007.

Chinese Office Action, with English Translation, issued in Chinese Patent Application No. CN 2007100843746, dated Jun. 5, 2009.

Takata et al., "A Status Detection of Secure Communication in Secure Service Platform", IEICE technical Report, vol. 105, No. 194, The Institute of Electronics, Information and Communication Engineers, Japan, Jul. 15, 2005, pp. 53-58.

Japanese Office Action, with English translation thereof, issued in Japanese Patent Application No. 2006-052361, dated Jun. 2, 2011.

* cited by examiner

FIG. 3

NETWORK ADDRESS STORAGE UNIT 21

| DEVICE ID (210) | NETWORK ADDRESS (211) |
|---|---|
| m1@*.* | *.*.*.* |
| m2@*.* | *.*.*.* |
| m3@*.* | *.*.*.* |
| ⋮ | ⋮ |

FIG. 4

COMMUNICATION CONDITION STORAGE UNIT 22

| DEVICE ID (220) | ENCRYPTION ALGORITHM (221) | KEY LENGTH (222) | HASH FUNCTION TYPE (223) | ... | PRIORITY RANKING (224) |
|---|---|---|---|---|---|
| m1@.*.* | * * * | * * | * * * | ... | 1 |
|  | * * * | * * | * * * | ... | 2 |
|  | * * * | * * | * * * | ... | 3 |
|  | ⋮ | ⋮ | ⋮ | ⋮ | ⋮ |
| m2@.*.* | * * * | * * | * * * | ... | 1 |
|  | * * * | * * | * * * | ... | 2 |
|  | * * * | * * | * * * | ... | 3 |
|  | ⋮ | ⋮ | ⋮ | ⋮ | ⋮ |
| ⋮ | ⋮ | ⋮ | ⋮ | ⋮ | ⋮ |

FIG. 5

GROUP MEMBER INFORMATION STORAGE UNIT 23

| GROUP ID 230 | DEVICE ID 231 |
|---|---|
| g1@*.* | m1@*.* |
| | m2@*.* |
| | m3@*.* |
| | ⋮ |
| g2@*.* | m4@*.* |
| | m5@*.* |
| | ⋮ |
| ⋮ | ⋮ |

FIG. 6

GROUP ADDRESS STORAGE UNIT 24

| GROUP ID 240 | GROUP ADDRESS 241 |
|---|---|
| g1@*.* | 224.*.* |
| g2@*.* | 192.168.10.255 |
| ⋮ | ⋮ |

COMMUNICATION CONDITION REGISTRATION REQUEST 60

KEY INFORMATION GENERATION INSTRUCTION 61

FIG. 12

KEY INFORMATION GENERATION INSTRUCTION STORAGE UNIT 300

| VALIDITY TIME-LIMIT 3000 | GROUP ID 3001 | DEVICE ID LIST INCLUDING DEVICE IDs OF DEVICES WITHIN GROUP WHICH ARE CURRENTLY LOGGED IN 3002 |
|---|---|---|
| * * * | * * * | * * * |
| * * * | * * * | * * * |
| : | : | : |

COMMUNICATION CONDITION STORAGE UNIT 511

| ENCRYPTION ALGORITHM 5110 | KEY LENGTH 5111 | HASH FUNCTION TYPE 5112 | ... | PRIORITY RANKING 5113 |
|---|---|---|---|---|
| * * * | * * | * * * | ... | 1 |
| * * * | * * | * * * | ... | 2 |
| * * * | * * | * * * | ... | 3 |
| ⋮ | ⋮ | ⋮ | ⋮ | ⋮ |

INFORMATION PROCESSING DEVICE 70

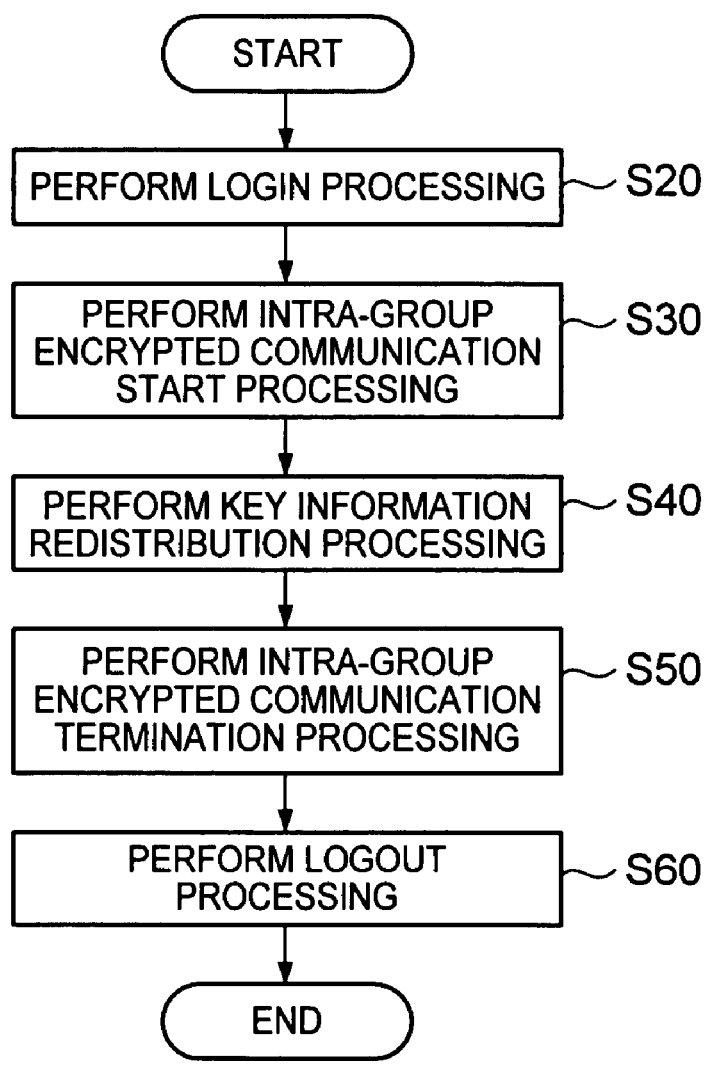

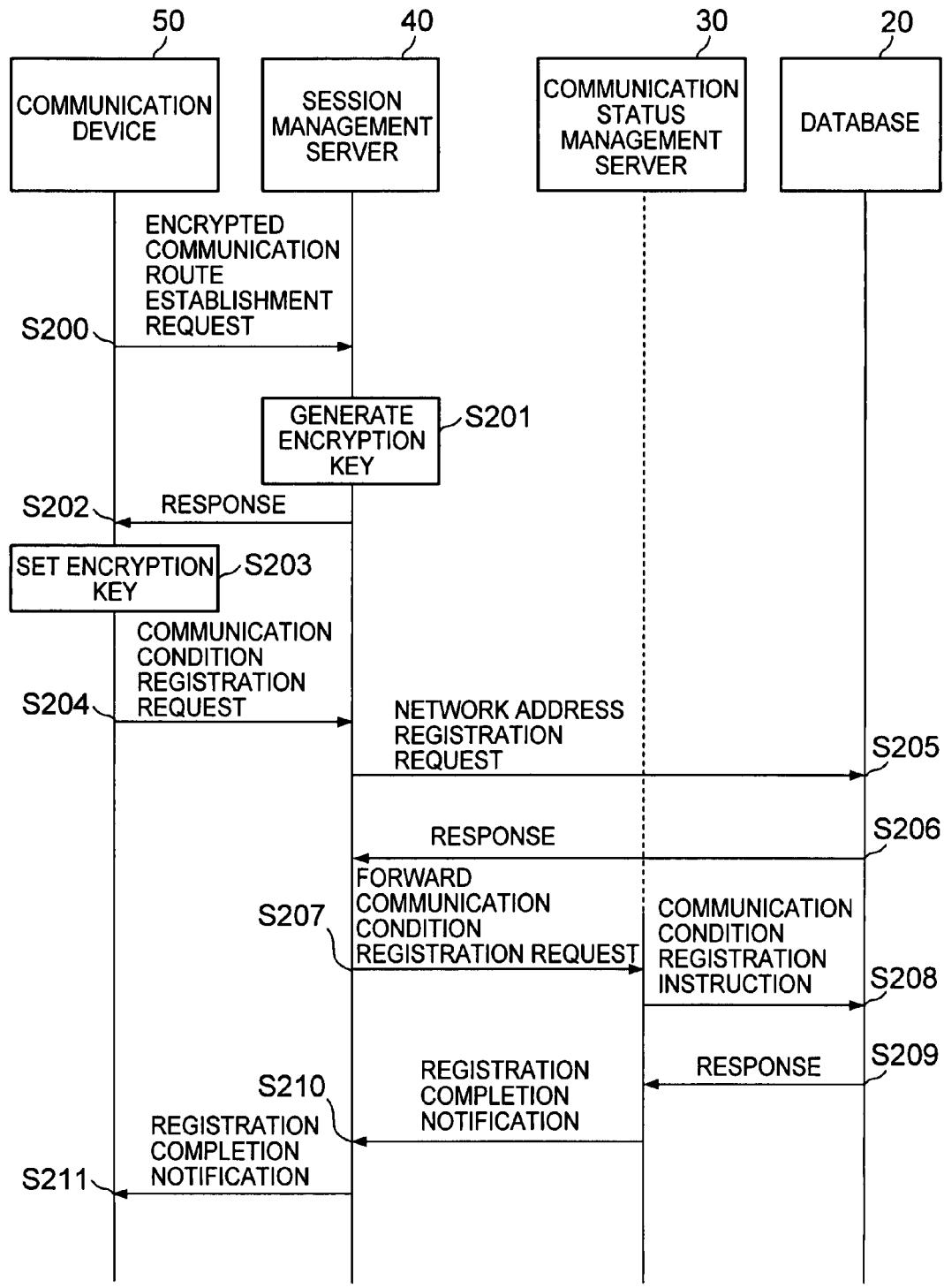

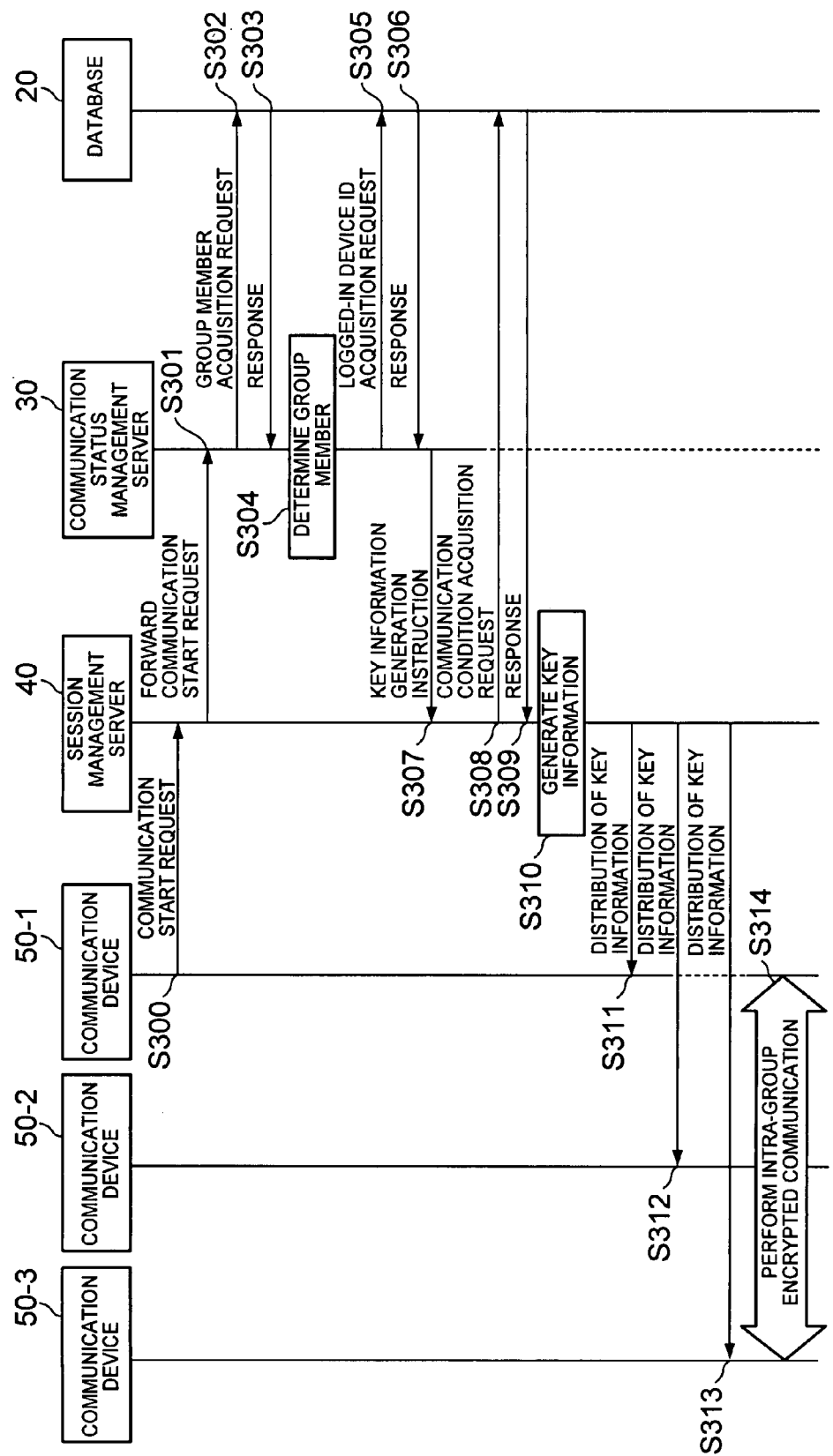

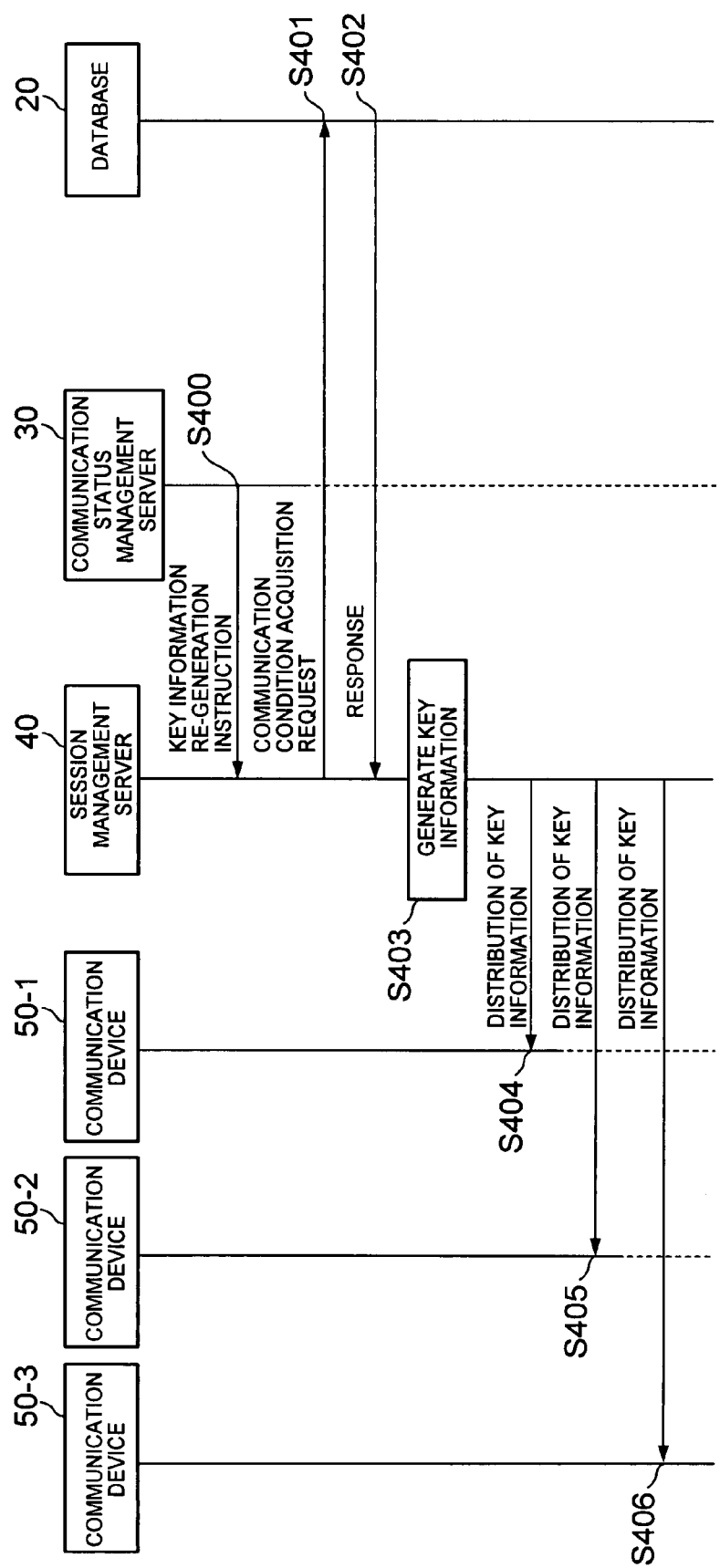

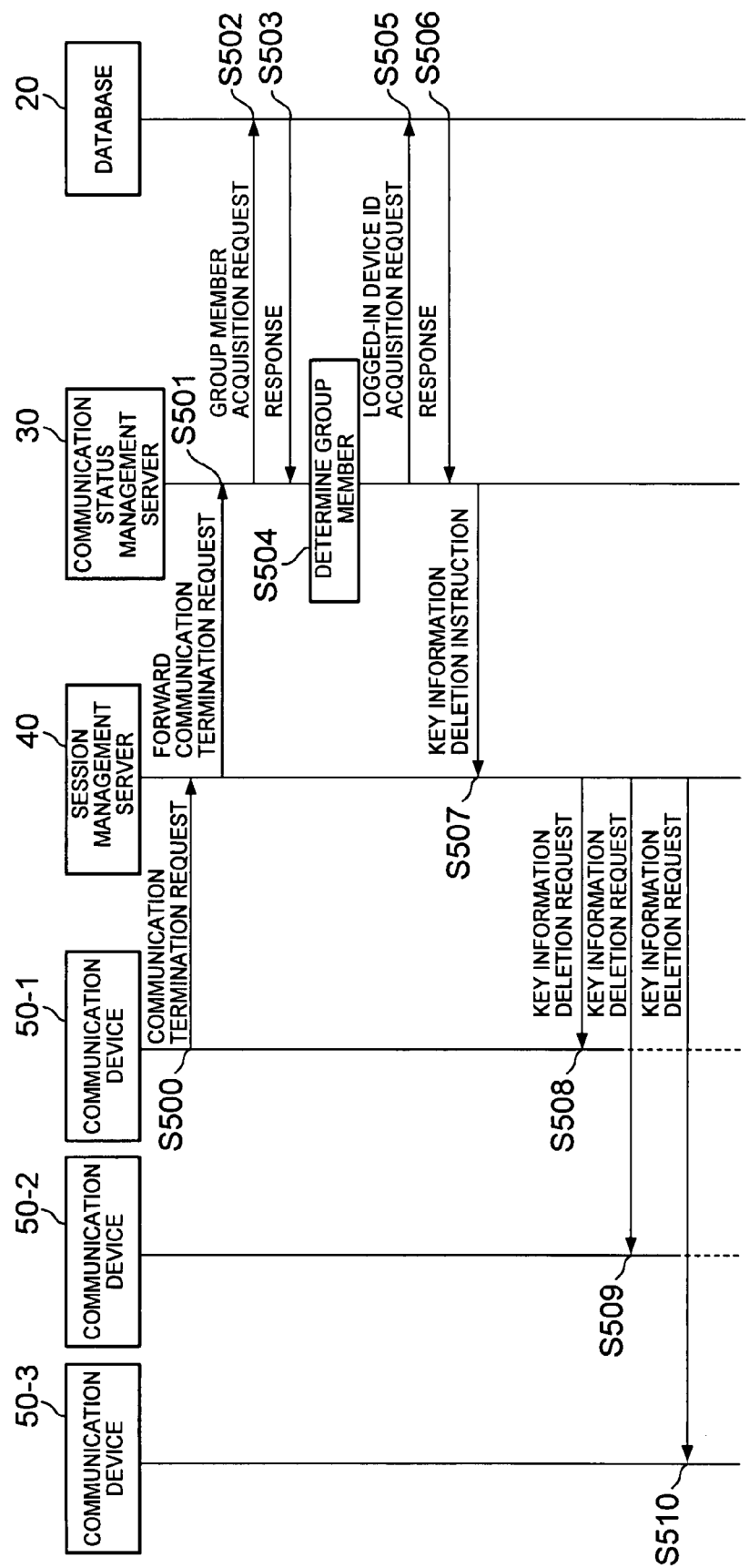

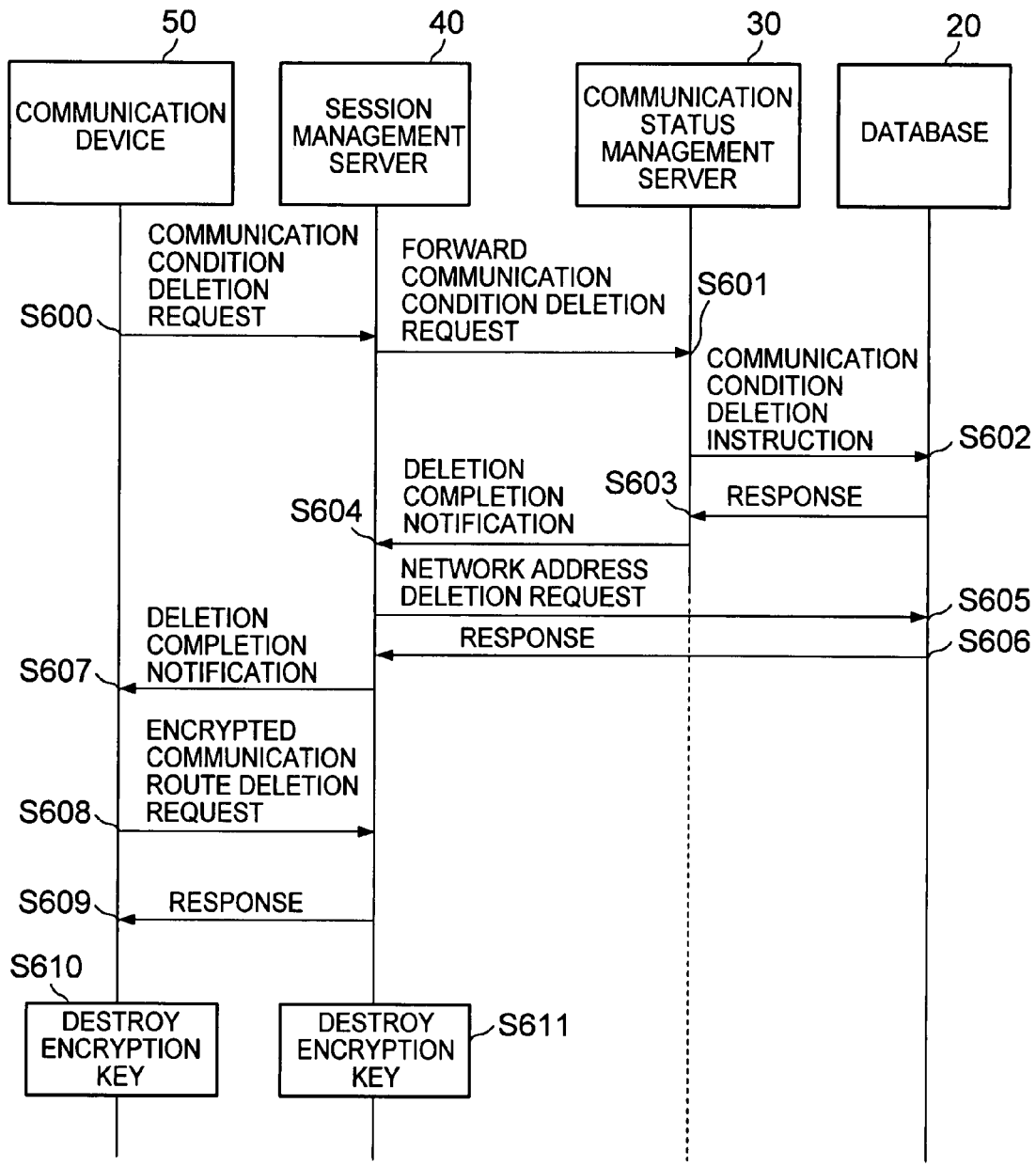

ENCRYPTED COMMUNICATION SYSTEM, COMMUNICATION STATUS MANAGEMENT SERVER, ENCRYPTED COMMUNICATION METHOD, AND COMMUNICATION STATUS MANAGEMENT METHOD

INCORPORATION BY REFERENCE

This application claims priority based on a Japanese patent application, No. 2006-052361 filed on Feb. 28, 2006, the entire contents of which are incorporated herein by reference.

BACKGROUND OF THE INVENTION

The present invention relates to an encrypted communication technique, and more particularly, to a technique of distributing an encryption key for use in encrypted communication within a group including a plurality of communication devices, to each of the communication devices.

Internet RFC/STD/FYI/BCP Archives, "RFC 3740—The Multicast Group Security Architecture", [retrieved on Feb. 1, 2006], Internet URL: <http://www.faqs.org/rfcs/rfc3740.html> (hereinafter, referred to as Non-patent Document 1) discloses a technique in which a key server distributes a key and settings information (security association) for use in encrypted communication, to a plurality of communication devices that are registered in advance as a group, and each of the communication devices that perform encrypted communication uses the key and other information distributed from the key server, to perform encrypted communication with other communication devices within the group. By using the technique disclosed in Non-patent Document 1, each communication device can reduce the processing load generated by creating the key and the other information used in the encrypted communication.

SUMMARY OF THE INVENTION

When the number of communication devices registered in the group becomes large, in addition to cases where all of the communication devices in the group participate in the encrypted communication together, there are cases where the encrypted communication take place only among communication devices that are participating in the encrypted communication in the group, even though other communication devices may be registered. In other words, the intra-group encrypted communication service is provided only to those communication devices that are in a state in which they can receive the intra-group encrypted communication service, and the intra-group encrypted communication service is not provided to communication devices which are not booted up or to communication devices which are in a state where they can communicate through the network but cannot receive the intra-group encrypted communication service.

In Non-patent Document 1 described above, there is no thought given to the concept of whether or not the state is such that the intra-group encrypted communication service can be received. And in a case where the encrypted communication is conducted among multiple communication devices, the key and other information generated by the key server are distributed to all of the multiple communication devices that were registered into the group beforehand. Moreover, with respect to the method of distributing the key and other information, the aforementioned Non-patent Document 1 defines no specific limitations, but it is thought that the key and other information will be distributed by unicasts to each of the multiple communication devices registered in a group beforehand. In such a case, the key and other information used for the intra-group encrypted communication will be distributed even to those communication devices which are in a state in which they cannot receive the intra-group encrypted communication service, thus leading to cases where unnecessary traffic is generated on the network.

Furthermore, it is conceivable that the traffic generated by distributing the key and other information can be held low by distributing the key and other information via a broadcast or a multicast. However, in cases where the key and other information are distributed through a broadcast, the key server must be positioned at the same segment as the communication devices in the group in which the encrypted communication is carried out. Therefore, when a group includes a segment different from the one which the key server belongs to, the key server has to distribute the key and other information to that group via a unicast.

Additionally, in cases were the key and other information are distributed through a multicast, in addition to making the settings for the key server and the communication devices, it is also necessary to make the settings for each of the relay devices within the network for forwarding the multicast addresses, thus greatly increasing the costs for operating the network, such as adding and deleting groups, and adding and deleting communication devices within the group and the like. Accordingly, there are cases where it is not practical to distribute the key and other information through multicasts, and the key server has to distribute the key and other information via unicasts, thus creating unnecessary traffic.

The present invention has been made to solve the above-mentioned problems, and it is therefore an object of the present invention to reduce the traffic generated by distributing the key and other information used for the intra-group encrypted communication.

That is, the encrypted communication system of the present invention maintains a list of a plurality of communication devices that belong to the group, and information showing whether or not each of those communication devices is participating in the intra-group encrypted communication (for example, whether or not they are logged in). The encrypted communication system refers to a database to specify communication devices that belong to the group and are participating in the intra-group encrypted communication, and then generates an encrypted communication key for use among the communication devices that were identified, and then distributes the key to the identified communication devices.

For instance, according to a first aspect of the present invention, there is provided an encrypted communication system which uses key information generated by a session management server to achieve intra-group encrypted communication within a group including a plurality of communication devices, the encrypted communication system including: a database which stores information relating to each of the communication devices; and a communication status management server which manages the intra-group encrypted communication performed by the plurality of communication devices, in which: the database includes: participating device address storage means which stores a network address of each participating device, which is a communication device participating in the intra-group encrypted communication, so that the network address is associated with a device ID which identifies the communication device; and group member information storage means which stores the device ID of each of the plurality of communication devices, so that the device ID is associated with a group ID which identifies a group to which the communication devices belong; and the communication status management server includes: group member extraction means which, on receiving an intra-group encrypted communication request including a group ID, refers to the group member information storage means based on the group ID, and extracts device IDs of the communication devices belonging to a group corresponding to the group ID; and participating device ID extraction means which refers to the participating device address storage means, extracts, from among the device IDs extracted by the group member extraction means, a device ID stored in the participating device address storage means in association with a network address, and outputs the device ID to the session management server, to thereby cause the session management server to distribute the key information for use in the intra-group encrypted communication within the group, to each of the participating device within the group corresponding to the group ID contained within the intra-group encrypted communication request.

According to a second aspect of the present invention, there is provided an encrypted communication system which achieves intra-group encrypted communication, being encrypted communication within a group including a plurality of communication devices, including: a database which stores information relating to each of the communication devices; a communication status management server which manages the intra-group encrypted communication performed by the plurality of communication devices; a session management server which generates key information for use in the intra-group encrypted communication, and distributes the key information to each of the communication devices; and a plurality of communication devices, in which: the database includes: participating device address storage means which stores a network address of each participating device, which is a communication device participating in the intra-group encrypted communication, so that the network address is associated with a device ID which identifies the communication device; group member information storage means which stores the device IDs of each of the plurality of communication devices, so that the device IDs are associated with a group ID which identifies a group to which the communication devices belong; and communication condition storage means which stores at least one communication condition executable by each of the participating devices in the intra-group encrypted communication, so that the communication conditions are associated with the device ID; the communication status management server includes: group member extraction means which, on receiving an intra-group encrypted communication request including a group ID via the session management server, refers to the group member information storage means based on the group ID, and extracts the device IDs of communication devices belonging to the group corresponding to the group ID; and participating device ID extraction means which refers to the participating device address storage means, extracts, from among the device IDs extracted by the group member extraction means, a device ID stored in the participating device address storage means in association with a network address, and outputs the device ID to the session management server; the session management server includes: server-side encrypted communication means which establishes an encrypted communication route with respect to the communication device, and sends and receives data to and from the communication device via the established encrypted communication route; participating device registration means which, on receiving a notification of participation in the intra-group encrypted communication via the encrypted communication route, from the communication device stores a network address of the communication device into the participating device address storage means, as a network address of a participating device, so that the network address is associated with the device ID; and key generation and distribution means which receives the device IDs outputted from the participating device ID extraction means, extracts, from the communication condition storage means, the communication conditions associated with each of the device IDs, extracts, from the extracted communication conditions, a common communication condition that is associated with the plurality of device IDs, generates key information which is used for performing the intra-group encrypted communication executable under the extracted communication condition, and sends the generated key information to each of the communication devices that correspond to the device IDs received from the participating device ID extraction means; and each of the plurality of communication devices includes: communication device side encrypted communication means which establishes an encrypted communication route with respect to the session management server, and sends and receives data to and from the session management server via the established encrypted communication route; encrypted communication request means which transmits, in a case where the intra-group encrypted communication is initiated, the intra-group encrypted communication request, to the session management server via the encrypted communication route; and intra-group encrypted communication means which, in a case where the key information is received from the session management server via the encrypted communication route in response to the intra-group encrypted communication request, uses the key information to execute intra-group encrypted communication with another communication device in the group.

According to a third aspect of the present invention, there is provided a communication status management server which instructs a session management server to use information stored in a storage device to distribute key information, in an encrypted communication system which uses key information generated by the session management server to achieve intra-group encrypted communication within a group including a plurality of communication devices, the communication status management server including: group member extraction means which, on receiving an intra-group encrypted communication request including a group ID, refers to the storage device based on the group ID, and extracts the device IDs of the communication devices belonging to the group that corresponds to that group ID, from the group member information storage means of the storage device, in which the device IDs of each of the plurality of communication devices are stored in association with a group ID which distinguishes the group to which the communication devices belong; and participating device ID extraction means which refers to the participating device address storage means of the storage device, in which the network addresses of each of the participating devices, which are communication devices participating in the intra-group encrypted communication, are stored in association with a device ID which distinguishes the communication device, extracts, from among the device IDs extracted by the group member extraction means, a device ID stored in the participating device address storage means in association with a network address, and outputs the device ID to the session management server, to thereby cause the session management server to distribute the key information for use in the intra-group encrypted communication within the group, to each of the participating devices within the group corresponding to the group ID contained within the intra-group encrypted communication request.

According to a fourth aspect of the present invention, there is provided encrypted communication methods in an encrypted communication system which uses key information generated by a session management server to achieve intra-group encrypted communication within a group including a plurality of communication devices, in which: the encrypted communication system includes: a database which stores information relating to each of the communication devices; and a communication status management server which manages the intra-group encrypted communication performed by the plurality of communication devices; the database includes: participating device address storage means which stores a network address of each participating device, which is a communication device participating in the intra-group encrypted communication, so that the network address is associated with a device ID which identifies each communication device; and group member information storage means which stores the device ID of each of the plurality of communication devices, so that the device ID is associated with a group ID which identifies a group to which the communication devices belong; and in which the method, performed by the communication status management server, includes: a group member extraction step of, on receiving an intra-group encrypted communication request including a group ID, referring to the group member information storage means based on the group ID, and extracting device IDs of the communication devices belonging to a group corresponding to the group ID; and a participating device ID extraction step of referring to the participating device address storage means, extracting, from among the device IDs extracted in the group member extraction step, a device ID stored in the participating device address storage means in association with a network address, and outputting the device ID to the session management server, so as to generate and distribute the key information for use in the intra-group encrypted communication within the group, to each of the participating devices within the group corresponding to the group ID contained within the intra-group encrypted communication request.

According to a fifth aspect of the present invention, there is provided an encrypted communication method for an encrypted communication system which achieves intra-group encrypted communication, being encrypted communication within a group including a plurality of communication devices, in which: the encrypted communication system includes: a communication status management server which manages the intra-group encrypted communication performed by the plurality of communication devices; a session management server which generates key information for use in the intra-group encrypted communication, and distributes the key information to each of the communication devices; and a plurality of communication devices: the database includes: participating device address storage means which stores a network address of each participating device, which is a communication device participating in the intra-group encrypted communication, so that the network address is associated with a device ID which identifies the communication device; group member information storage means which stores the device IDs of each of the plurality of communication devices, so that the device IDs are associated with a group ID which identifies a group to which the communication devices belong; and communication condition storage means which stores at least one communication condition executable by each of the participating devices in the intra-group encrypted communication, so that the communication condition is associated with the device ID; wherein the method, performed by the communication status management server, comprises: a group member extraction step of, on receiving an intra-group encrypted communication request including a group ID via the session management server, referring to the group member information storage means based on the group ID, and extracting the device IDs of communication devices belonging to the group corresponding to the group ID; and a participating device ID extraction step of referring to the participating device address storage means, extracting, from among the device IDs extracted in the group member extraction step, a device ID stored in the participating device address storage means in association with a network address, and outputting the device ID to the session management server; the method, performed by the session management server, comprises: a server-side encrypted communication step of establishing an encrypted communication route with respect to the communication device, and sending and receiving data to and from the communication device via the established encrypted communication route; a participating device registration step of, on receiving notification of participation in the intra-group encrypted communication from the communication device via the encrypted communication route, storing a network address of the communication device into the participating device address storage means as a network address of a participating device, so that the network address is associated with the device ID; and a key generation and distribution step of receiving the device IDs outputted in the participating device ID extraction step, extracting, from the communication condition storage means, the communication conditions associated with each of the device IDs, extracting, from the extracted communication conditions, a common communication condition that is associated with the plurality of device IDs, generating key information which is used for performing the intra-group encrypted communication executable under the extracted communication condition, and sending the generated key information to each of the communication devices that correspond to the device IDs outputted in the participating device ID extraction step; and the method, performed by each of the plurality of communication devices, comprises: a communication device side encrypted communication step of establishing an encrypted communication route with respect to the session management server, and sending and receiving data to and from the session management server via the established encrypted communication route; an encrypted communication request step of transmitting, in a case where the intra-group encrypted communication is initiated, an intra-group encrypted communication request, to the session management server via the encrypted communication route; and an intra-group encrypted communication step of using, in a case where the key information is received from the session management server via the encrypted communication route in response to the intra-group encrypted communication request, the key information to execute intra-group encrypted communication with another communication device in the group.

According to a sixth aspect of the present invention, there is provided a communication status management method for a communication status management server which instructs a session management server to use information stored in a storage device to generate key information, in an encrypted communication system which uses key information generated by the session management server to achieve intra-group encrypted communication within a group including a plurality of communication devices, in which the communication status management server performs: a group member extraction step of, on receiving an intra-group encrypted communication request including a group ID, referring to the storage device based on the group ID, and extracting the device IDs of the communication devices belonging to the group that corresponds to that group ID, from the group member information storage means of the storage device, in which the device IDs of each of the plurality of communication devices are stored in association with a group ID which distinguishes the group to which the communication devices belong; and a participating device ID extraction step of referring to the participating device address storage means of the storage device, in which the network addresses of each of the participating devices, which are communication devices participating in the intra-group encrypted communication, are stored in association with a device ID which distinguishes the communication device, extracting, from among the device IDs extracted in the group member extraction step, a device ID stored in the participating device address storage means in association with a network address, and outputting the device ID to the session management server, to thereby cause the session management server to distribute the key information for use in the intra-group encrypted communication within the group, to each of the participating devices within the group corresponding to the group ID contained within the intra-group encrypted communication request.

The encrypted communication system of the present invention can reduce traffic generated by distributing the key and settings information for use in the intra-group encrypted communication.

BRIEF DESCRIPTION OF THE DRAWINGS

In the accompanying drawings:

FIG. 3 is an explanatory diagram showing a data configuration stored in a network address storage unit;

FIG. 4 is an explanatory diagram showing an example of a data configuration stored in a communication condition storage unit;

FIG. 5 is an explanatory diagram showing an example of a data configuration stored in a group member information storage unit;

FIG. 6 is an explanatory diagram showing an example of a data configuration stored in a group address storage unit;

FIG. 12 is an explanatory diagram showing an example of a data configuration stored in a key information generation instruction storage unit;

FIG. 17 is a flowchart showing an example of operations of the encrypted communication system;

FIG. 18 is a sequence diagram showing an example of detailed operations of the encrypted communication system during login processing (S20);

FIG. 19 is a sequence diagram showing detailed operations of the encrypted communication system during intra-group encrypted communication start processing (S30);

FIG. 20 is a sequence diagram showing an example of detailed operations of the encrypted communication system during key information redistribution processing (S40);

FIG. 21 is a sequence diagram showing an example of detailed operations of the encrypted communication system during intra-group encrypted communication termination processing (S50); and FIG. 22 is a sequence diagram showing an example of detailed operations of the encrypted communication system during logout processing (S60).

DETAILED DESCRIPTION OF THE EMBODIMENTS

An embodiment of the present invention is explained below.

Figure 1:
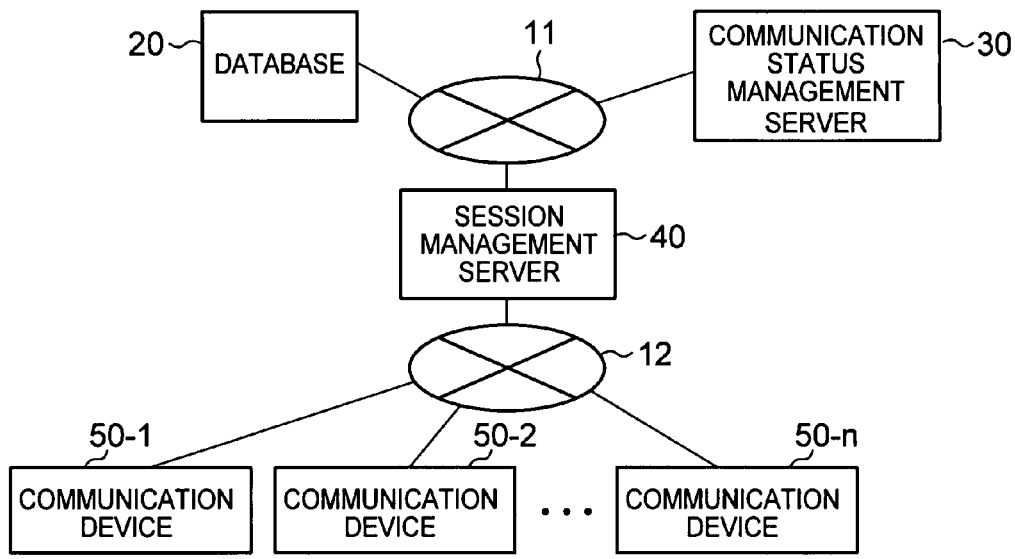
FIG. 1 is a system configuration showing the configuration of an encrypted communication system according to an embodiment of the present invention.

FIG. 1 is a system configuration diagram showing a configuration of an encrypted communication system 10 according to an embodiment of the present invention. The encrypted communication system 10 includes a database 20, a communication status management server 30, a session management server 40, and a plurality of communication devices 50. The database 20, the communication status management server 30, and the session management server 40 are each connected to a management network 11, and communicate with each other through the management network 11. The session management server 40 is additionally connected to a user network 12.

Each of the plurality of communication devices 50 is, for example, a general-purpose computer, a portable information terminal, an internet protocol (IP) telephone device, or a server with communication functions (an application server or a proxy server). Each communication device 50 is connected to a user network 12 such as the Internet, and communicates with the session management server 40 and other communication devices 50 via the user network 12. In this case, the multiple communication devices 50 are configurations in groups of two or more communication devices 50. Each communication device 50 uses key information distributed from the session management server 40, to perform intra-group encrypted communication with one or more of the other communication devices 50 within the group.

The database 20 stores communication conditions of each of the communication devices 50, identification information for identifying the communication devices 50 that are logged in, identification information for identifying the communication devices 50 that belong to each group, and the like. When the communication status management server 30 receives a communication start request, which contains a group ID for identifying the group which performs intra-group encrypted communication, from a communication device 50 via the session management server 40, the server 30 refers to the database 20 and extracts the identification information of a communication device 50 that is in the group corresponding to the group ID and is currently logged in. Then, the communication status management server 30 sends the session management server 40 an instruction to generate the key information for use in the intra-group encrypted communication, along with the extracted identification information.

After sharing the encryption key with the communication device 50, the session management server 40, based on a communication condition registration request 60 sent from the communication device 50, registers the network address of the communication device 50 into the network address storage unit 21 of the database 20, and also, through the communication status management server 30, registers the communication conditions of the communication device 50 into the communication condition storage unit 22 of the database 20 (login processing). Furthermore, the session management server 40, based on a communication condition deletion request sent from the communication device 50, deletes the network address of the communication device 50 from the network address storage unit 21 of the database 20, and also, through the communication status management server 30, deletes the communication conditions of the communication device 50 from the communication condition storage unit 22 of the database 20 (logout processing). Furthermore, when the session management server 40 receives a device ID and a key information generation instruction from the communication status management server 30, the session management server 40 refers to the database 20 and extracts the communication conditions of the communication device 50 corresponding to the received device ID. Then, the session management server 40 generates the key information based on the extracted communication conditions, and sends the generated key information to each of the communication devices 50 that use the key information. In this case, key information includes either an encryption key or a seed that is information based on which an encryption key is generated, together with key length of the encryption key, type of encryption algorithm that uses the encryption key to perform encryption, and the like. Note that in this embodiment, the encryption key or the encryption key generated from the seed is used for encrypted communication based on a symmetric-key encryption method.

In this way, in the case where the intra-group encrypted communication is performed by the plurality of communication devices 50, the encrypted communication system 10 distributes the key information for use in the intra-group encrypted communication to each of the communication devices 50 that belong to the group and that are logged in. Therefore, the encrypted communication system 10 does not distribute the key information to the communication devices 50 that are able to communicate via the user network 12 but are not intended to be provided with the intra-group encrypted communication service and are not logged into the session management server 40. Therefore, the encrypted communication system 10 is able to reduce the traffic generated by the distribution of key information.

Note that in FIG. 1, the management network 11 and the user network 12 are depicted as physically different networks, but the management network 11 and the user network 12 may also be constructed by logically separating physically the same network using a virtual LAN (VLAN) or the like. Moreover, it is desirable that the management network 11 should be more secure than the user network 12.

Hereinafter, a more detailed explanation is given regarding the construction of the encrypted communication system 10 for realizing the functions described above.

Figure 2:
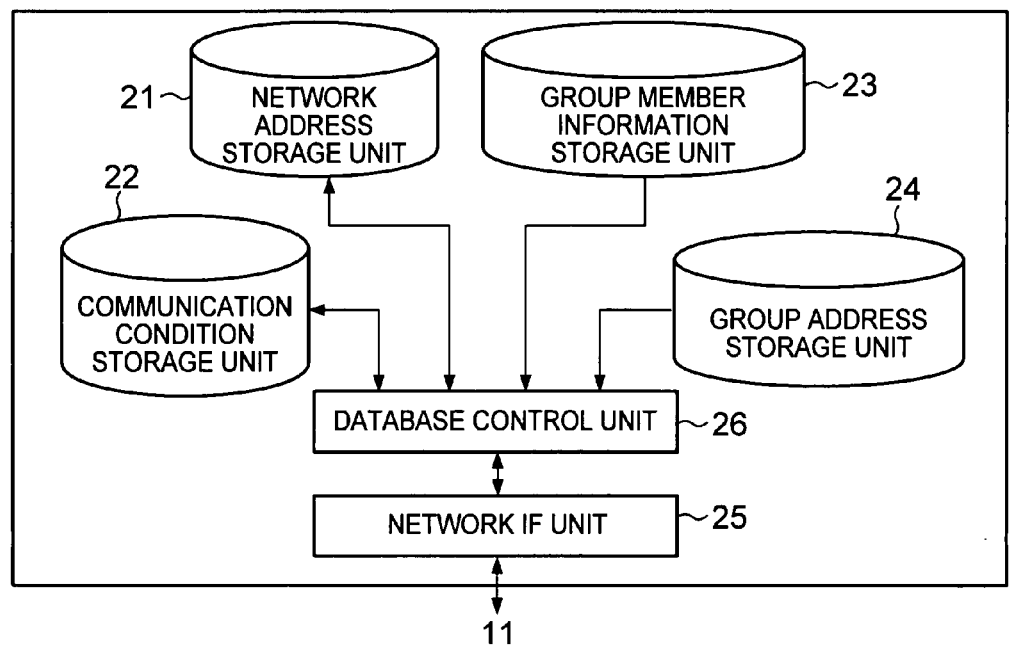
FIG. 2 is a block diagram showing an example of a detailed functional configuration of a database.

FIG. 2 is a block diagram showing one example of a detailed function configuration of the database 20. The database 20 includes a network address storage unit 21, a communication condition storage unit 22, a group member information storage unit 23, a group address storage unit 24, a network IF unit 25, and a database control unit 26.

The network address storage unit 21, for example, as shown in FIG. 3, stores a network address 211 of the logged-in communication device 50 such that the network address 211 is associated with a device ID 210 of the communication device 50. In this embodiment, the device ID 210 is, for example, a uniform resource identifier (URI). The network address 211 is, for example, an IP address.

As shown in FIG. 4, for example, in association with each device ID 220 of each of the communication devices 50, the communication condition storage unit 22 stores one or more communication conditions that the communication device 50 can execute in the intra-group encrypted communication. Each of those communication conditions contains a priority ranking 224, an algorithm 221 that can be executed by the corresponding communication device 50, a key length 222 of the encryption key that is used in the encrypted communication, and a hash function type 223 of the encryption key.

In this case, the "encryption algorithm 221" refers to information specifying an encryption/decryption procedure for defining a sequence of various types of conversion processes such as permutation, transposition, conversion, dividing, or shifting computations. A representative example of an encryption algorithm is the Advanced Encryption Standard (AES), or the like.

Upon reception of the communication condition deletion request containing device ID, the network address, and the communication conditions of the communication device 50 from the communication device 50 via the session management server 40, the communication status management server 30 registers the device ID and communication conditions contained in the communication condition registration request into the communication condition storage unit 22. Furthermore, upon reception of the communication condition deletion request containing the device ID of the communication device 50 from the communication device 50 via the session management server 40, the communication status management server 30 deletes, from the communication condition storage unit 22, the device ID and the communication conditions corresponding to the device ID that are contained in the communication condition deletion request.

As shown in FIG. 5, for example, the group member information storage unit 23 stores the device ID 231 of each communication device 50 that belongs to each group, such that the device ID 231 is associated with the group ID 230 for identifying the group.

As shown in FIG. 6, for example, for the group where intra-group encrypted communication is to be performed by multicast, broadcast, or the like, the group address storage unit 24 stores an group address 241 such as a multicast address or a broadcast address such that the group address 241 is associated with a group ID 240 for identifying the group. For groups where intra-group encrypted communication is to be performed with a unicast, the group ID corresponding to the group is not stored in the group address storage unit 24. Note that the data stored in the group member information storage unit 23 and the group address storage unit 24 is set in advance by a system administrator or the like.

The database control unit 26, in response to various requests received from the communication status management server 30 or the session management server 40 via the network IF unit 25, performs such processing as extracting and returning necessary data from the network address storage unit 21, the communication condition storage unit 22, the group member information storage unit 23, and the group address storage unit 24, and updating, in response to the request, the data inside the network address storage unit 21 and the communication condition storage unit 22.

Figure 7:
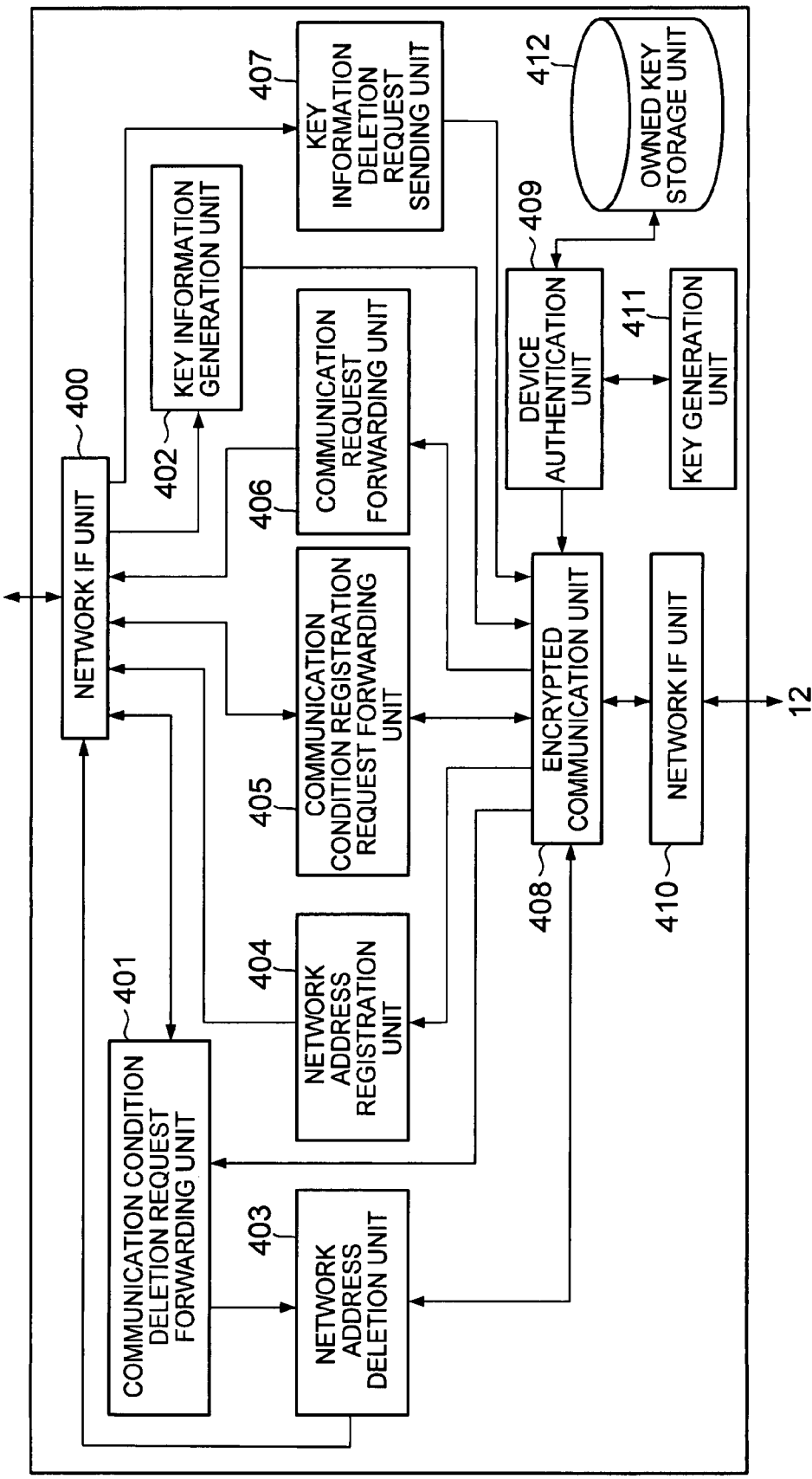
FIG. 7 is a block diagram showing an example of a detailed functional configuration of a session management server.

FIG. 7 is a block diagram showing an example of a detailed functional configuration of the session management server 40. The session management server 40 includes a network IF unit 400, a communication condition deletion request forwarding unit 401, a key information generation unit 402, a network address deletion unit 403, a network address registration unit 404, a communication condition registration request forwarding unit 405, a communication request forwarding unit 406, a key information deletion request sending unit 407, an encrypted communication unit 408, a device authentication unit 409, a network IF unit 410, a key generation unit 411, and an owned key storage unit 412.

The network IF unit 410 communicates with each of the communication devices 50 via the user network 12. The network IF unit 400 communicates with the database 20 or the communication status management server 30 via the management network 11. The owned key storage unit 412 stores a secret key of the session management server 40, and also a public key certificate proving that the public key for the secret key is authentic so that the communication device 50 can verify the session management server 40. The key generation unit 411 generates the encryption key for the encrypted communication to use in the encrypted communication with the communication device 50.

When the device authentication unit 409 receives an encrypted communication route establishment request from the communication device 50 via the network IF unit 410, the device authentication unit 409 performs authentication processing with the communication device 50. When authentication processing succeeds, the device authentication unit 409 causes the key generation unit 411 to generate the encryption key.

The device authentication unit 409 sends the communication device 50 an answer containing the generated encryption key, whereby the encryption key is shared with the communication device 50. Then, the device authentication unit 409 sets the encryption key corresponding to the communication device 50, to the encrypted communication unit 408. The communication between the session management server 40 and the communication device 50 are performed using the shared encryption key.

In this case, in this embodiment, the "logging in" by the communication device 50 refers to the following: after the encryption key is shared between the session management server 40 and the communication device 50, the session management server 40, based on a communication condition registration request 60 sent from the communication device 50, registers the network address of the communication device 50 in the network address storage unit 21 of the database 20, and also, through the communication status management server 30, registers the communication conditions of the communication device 50 in the communication condition storage unit 22 of the database 20. Furthermore, the "logged-in communication device 50" refers to a communication device 50 that shares a valid encryption key with the session management server 40, has its network address registered in the network address storage unit 21, and also has its communication conditions stored in the communication condition storage unit 22. Furthermore, a "logging out" by the communication device 50 refers to the following: after the session management server 40 deletes the network address of the communication device 50 from the network address storage unit 21 in the database 20, and also deletes the communication conditions of the communication device 50 from the communication condition storage unit 22, the valid encryption key that is shared by the session management server 40 and the communication device 50 is destroyed in both devices.

Figure 8:
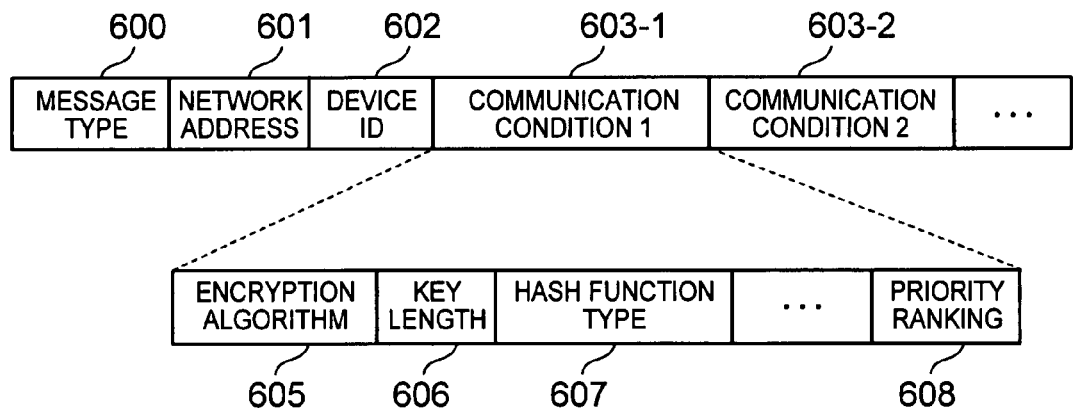
FIG. 8 is an explanatory diagram showing an example of data included in a communication condition registration request.

The network address registration unit 404 and the communication condition registration request forwarding unit 405 receive the communication condition registration request, which is information indicating participation in the intra-group encrypted communication, from the communication device 50 via the encrypted communication unit 408. The communication condition registration request 60 has a data configuration as shown in FIG. 8, for example. The communication condition registration request 60 includes a message type 600 showing that the message is the communication condition registration request, a network address 601 of the communication device 50 that is a transmission source of the communication condition registration request 60, a device ID 602 of the communication device 50, and one or more communication conditions 603 achievable by the communication device 50. Each of the communication conditions 603 contains an encryption algorithm 605, a key length 606, a hash function type 607, and a priority ranking 608.

The network address registration unit 404 sends the network address 601, which is contained in the received communication condition registration request 60, to the network address storage unit 21 of the database 20 via the network IF unit 400. Upon reception of a response showing that the registration is complete, the network address registration unit 404 notifies this to the communication condition registration request forwarding unit 405. When the registration completion notification is received from the network address registration unit 404, the communication condition registration request forwarding unit 405 forwards the communication condition registration request 60 to the communication status management server 30 via the network IF unit 400. Then, when the registration completion notification is received from the communication status management server 30, the communication condition registration request forwarding unit 405 sends the received registration completion notification, via the encrypted communication unit 408, to the communication device 50 that has sent the communication condition registration request 60.

The communication request forwarding unit 406 receives a communication start request or a communication termination request from the communication device 50 via the encrypted communication unit 408, and forwards the received communication start request or the communication termination request to the communication status management server 30 via the network IF unit 400. Furthermore, upon reception of a communication start refusal response or a communication termination refusal response from the communication status management server 30 via the network IF unit 400, the communication request forwarding unit 406 forwards the received communication start refusal response or communication termination refusal response, to the communication device 50 via the encrypted communication unit 408.

Figure 9:
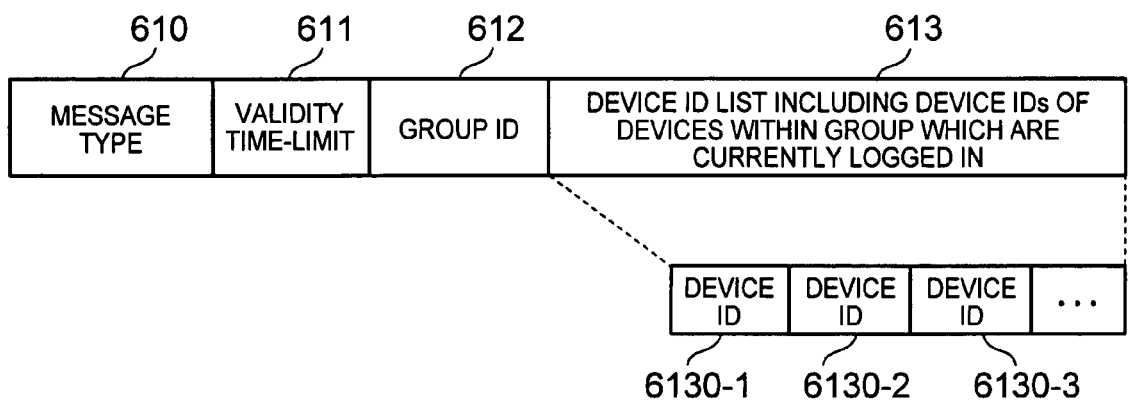
FIG. 9 is an explanatory diagram showing data included in a key information generation instruction.

The key information generation unit 402 receives the key information generation instruction that is to be used for the intra-group encrypted communication, via the network IF unit 400. A key information generation instruction 61 has a data configuration as shown in FIG. 9, for example. The key information generation instruction 61 includes a message type 610 showing the key information generation instruction, a validity time-limit 611 for the key information to be generated, a group ID 612 of the group where the encrypted communication is to be performed, and a device ID list 613. The device ID list 613 includes device IDs 6130 of one or more communication devices 50 that belong to the group corresponding to the group ID 612 and are currently logged in.

The key information generation unit 402 sends a communication condition acquisition request, which contains the device ID 6130, to the database 20 via the network IF unit 400, to thereby acquire the communication conditions of the communication devices 50 corresponding to each of the device IDs 6130. Then, based on the communication conditions obtained for each of the communication devices 50, the key information generation unit 402 extracts the communication conditions that are common to the communication devices 50. The key information generation unit 402 generates key information containing the key to be used in the intra-group encrypted communication executable in the extracted communication conditions.

Then, based on the group ID 612 contained in the key information generation instruction 61, the key information generation unit 402 refers to the group address storage unit 24 of the database 20 via the network IF unit 400. If there is a group address 241 corresponding to the group ID 612 in the group address storage unit 24, the key information generation unit 402 acquires the group address 241 that corresponds to the group ID 612. Further, based on the device ID 6130 contained in the key information generation instruction 61, the key information generation unit 402 refers to the network address storage unit 21 of the database 20 via the network IF unit 400, and acquires the network address 211 corresponding to each of the device IDs 6130.

Figure 10:
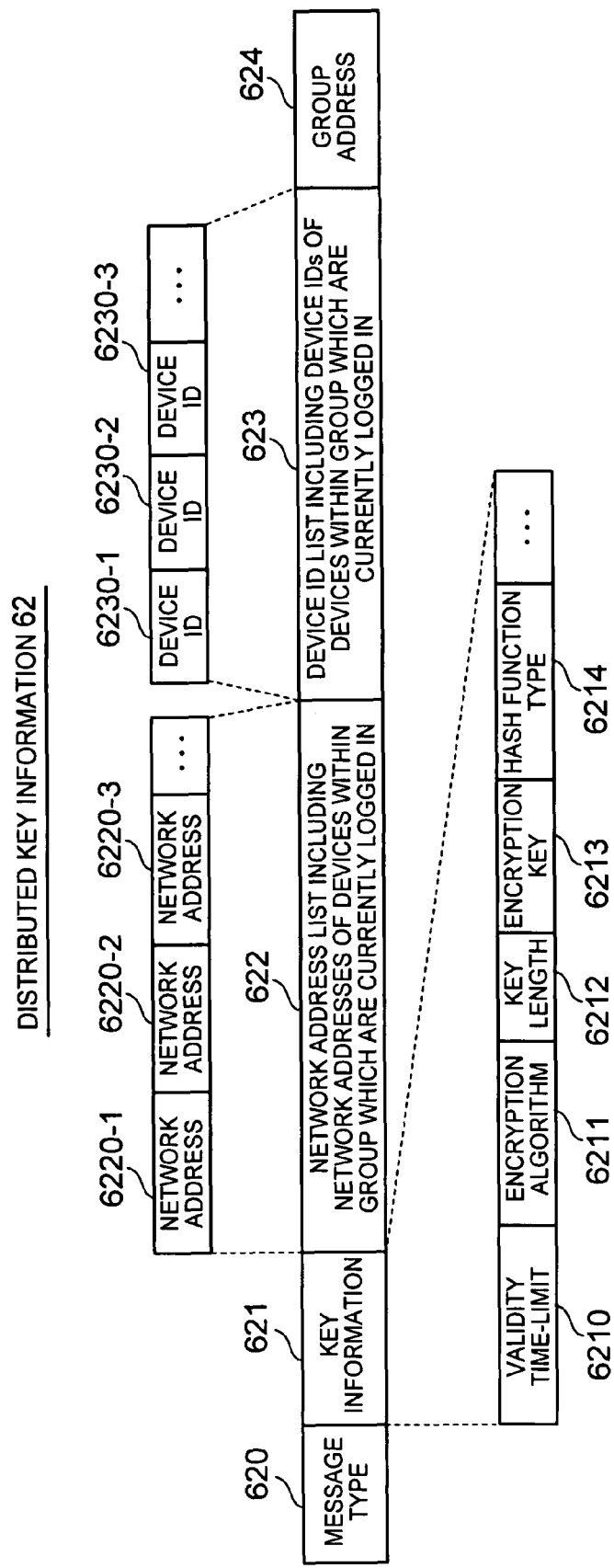
FIG. 10 is an explanatory diagram showing an example of data included in distributed key information.

Based on the generated key information and the like, the key information generation unit 402 generates distributed key information 62, for example, as shown in FIG. 10. The distributed key information 62 includes a message type 620 showing that the message is distributed key information, key information 621, a network address list 622, a device ID list 623, and a group address 624.

The key information 621 includes such things as a validity time-limit 6210 of the key information 621, an encryption algorithm 6211, a key length 6212, an encryption key 6213, and a hash function type 6214. Note that the key information 621 may contain a seed instead of the encryption key 6213. The network address list 622 contains network addresses 6220 of one or more communication devices 50 that belong to the group performing encrypted communication and that are also logged in. The network address ID list 623 contains the device IDs 6230 of the communication devices 50 that belong to the group conducting encrypted communication and are also logged in. Note that when no group address for the group is stored in the group address storage unit 24 of the database 20, the group address 624 contains null data.

The key information generation unit 402 sends the generated distributed key information 62 to each communication device 50 corresponding to each of the network addresses 6220 in the distributed key information 62 (for example, by means of a unicast) via the encrypted communication unit 408. Thus, the session management server 40 distributes the generated key information, along with the device ID and network address of the communication device 50 that uses the key information to perform intra-group encrypted communication. Therefore, each communication device 50 can confirm the presence of the other communication devices 50 participating in the intra-group encrypted communication.

The key information generation unit 402 receives a redistribution instruction to redistribute the key information being used in the intra-group encrypted communication, from the communication status management server 30, via the network IF unit 400. The key information redistribution instruction differs from the key information generation instruction 61 in terms of its message type 610. Otherwise, it has a similar data configuration to the key information generation instruction 61 shown in FIG. 9. When the key information redistribution instruction is received, just like when the key information generation instruction is received, the key information generation unit 402 then generates the distributed key information 62 shown in FIG. 10 based on the information contained in the key information redistribution instruction, and distributes the distributed key information 62 thus generated to the corresponding communication device 50.

When the key information deletion request sending unit 407 receives a key information deletion request containing the device ID from the communication status management server 30 via the network IF unit 400, the key information deletion request sending unit 407 then sends the received key information deletion request via the encrypted communication unit 408 to the communication device 50 identified by the device ID contained in the key information deletion request.

The communication condition deletion request forwarding unit 401 and the network address deletion unit 403 receive a communication condition deletion request, which is information indicating a desire to stop participating in the intra-group encrypted communication, from the communication device 50, via the encrypted communication unit 408. The communication condition deletion request contains the device ID of the communication device 50. The communication condition deletion request forwarding unit 401 forwards the received communication condition deletion request, to the communication status management server 30 via the network IF unit 400. Then, when the deletion completion notification is received from the communication status management server 30 via the network IF unit 400, the communication condition deletion request forwarding unit 401 notifies the fact to the network address deletion unit 403.

When completion of the deletion has been notified from the communication condition deletion request forwarding unit 401, the network address deletion unit 403 deletes, from the network address storage unit 21 of the database 20, the network address corresponding to the device ID contained in the communication condition deletion request, and sends the deletion completion notification through the encrypted communication unit 408 to the communication device 50 that has sent the communication condition deletion request.

Figure 11:
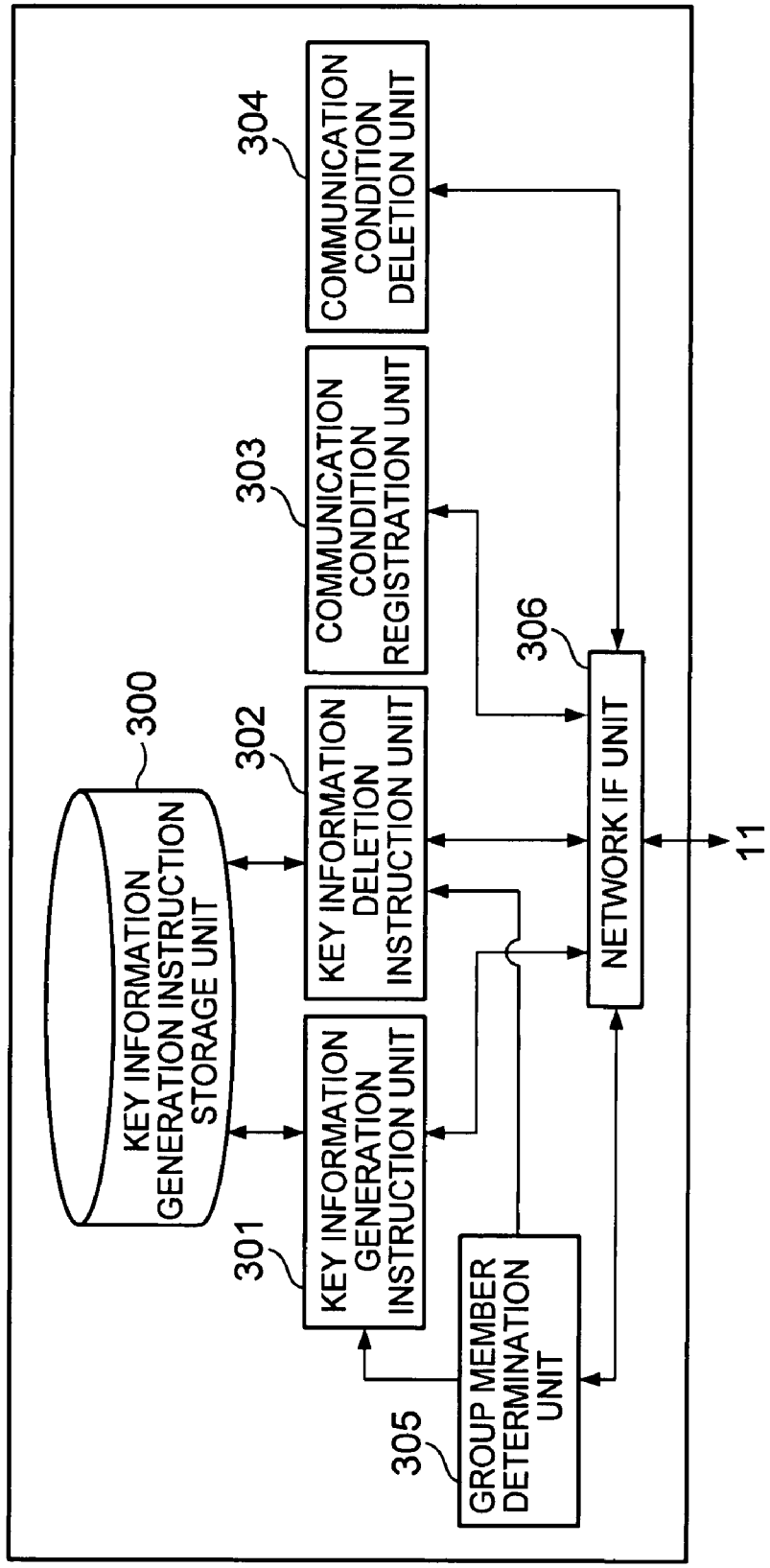
FIG. 11 is a block diagram showing an example of a detailed functional configuration of a communication status management server.

FIG. 11 is a block diagram showing an example of a detailed functional configuration of the communication status management server 30. The communication status management server 30 is provided with a key information generation instruction storage unit 300, a key information generation instruction unit 301, a key information deletion instruction unit 302, a communication condition registration unit 303, a communication condition deletion unit 304, a group member determination unit 305, and a network IF unit 306.

The network IF unit 306 communicates with the database 20 or the session management server 40, via the management network 11. When the communication condition registration unit 303 receives the communication condition registration request 60 shown in FIG. 8 from the session management server 40 via the network IF unit 306, the communication condition registration unit 303 then sends, to the database 20, the communication conditions and device ID contained in the received communication condition registration request 60, thereby causing the database 20 to register the communication conditions in the communication condition storage unit 22 in correspondence with the appropriate device ID. Then, when the communication condition registration unit 303 receives a response showing that the registration is complete from the database 20, the communication condition registration unit 303 sends a registration completion notification to the session management server 40 via the network IF unit 306.

When the communication condition deletion unit 304 receives the communication condition deletion request containing the device ID from the session management server 40 via the network IF unit 306, the communication condition deletion unit 304 then sends the device ID to the database 20, thereby causing the database 20 to delete device ID and the communication conditions that are registered in association with the device ID from the communication condition storage unit 22. Then, when the communication condition deletion unit 304 receives from the database 20 a response indicating that the deletion is complete, the communication condition deletion unit 304 sends the deletion completion notification through the network IF unit 306 to the session management server 40.

When the group member determination unit 305 receives, from the session management server 40, the communication start request containing the device ID of the communication device 50 that sent the request, and the group ID of the group conducting encrypted communication, the group member determination unit 305 then sends to the database 20 a group member acquisition request containing the group ID, to thereby acquire from the database 20 the device ID that is stored in the group member information storage unit 23 corresponding to the group ID in question. Then, the group member determination unit 305 determines, based on the acquired device ID, whether or not the device ID contained in the communication start request is included among the acquired device IDs.

If the device ID contained in the communication start request is not contained among the device IDs acquired from the database 20, then the group member determination unit 305 sends a communication start refusal response containing the device ID to the session management server 40 via the network IF unit 306.

If the device ID contained in the communication start request is included among the device IDs acquired from the database 20, then the group member determination unit 305 sends the group ID contained in the communication start request and the device ID acquired from the database 20 to the key information generation instruction unit 301.

Furthermore, when the group member determination unit 305 receives a communication termination request, which contains the device ID of the communication device 50 of the transmission source and the group ID of the group conducting encrypted communication, from the session management server 40 via the network IF unit 306, the group member determination unit 305 then sends a group member acquisition request containing the group ID to the database 20, to thereby acquire the device ID stored in the group member information storage unit 23 that corresponds to the group ID in question. Then, the group member determination unit 305 determines, based on the acquired device ID, whether or not the device ID contained in the communication termination request is included among the acquired device IDs.

If the device ID contained in the communication termination request is not included among the device IDs acquired from the database 20, then the group member determination unit 305 sends a communication termination refusal response containing the device ID to the session management server 40 via the network IF unit 306.

If the device ID contained in the communication termination request is included among the device IDs acquired from the database 20, then the group member determination unit 305 sends the group ID contained in the communication termination request, and the device ID acquired from the database 20, to the key information deletion instruction unit 302.

When the key information generation instruction unit 301 receives the group ID and the device ID from the group member determination unit 305, the key information generation instruction unit 301 sends a logged-in device ID acquisition request containing the device ID received from the group member determination unit 305 to the database 20, whereby the key information generation instruction unit 301 acquires those device IDs that are associated with the network addresses in the network address storage unit 21. As a result, the key information generation instruction unit 301 can extract the device IDs of the communication devices 50 that belong to the group corresponding to the group ID and that are also currently logged in. Furthermore, the key information generation instruction unit 301 sets a key information validity time-limit for the key information to be generated.

Then, the key information generation instruction unit 301, as shown in FIG. 9, generates the key information generation instruction 61 containing the set validity time-limit 611, the group ID 612 received from the group member determination unit 305, and the device ID list 613 extracted. The key information generation instruction unit 301 then sends the generated key information generation instruction 61 through the network IF unit 306 to the session management server 40. The key information generation instruction unit 301 stores the sent key information generation instruction 61, into the key information generation instruction storage unit 300. As shown for example in FIG. 12, the group ID 3001 contained in the key information generation instruction 61, and the device ID list 3002, are stored in the key information generation instruction storage unit 300, in association with the validity time-limit 3000.

At predetermined timing, the key information generation instruction unit 301 refers to the key information generation instruction storage unit 300, and determines whether, before the validity time-limit has elapsed, there is a validity time-limit 3000 whose difference from the present moment is equal to or less than a predetermined value. If there is a validity time-limit 3000 extending for a length of time from the present moment, that is equal to or less than the predetermined value, then the key information generation instruction unit 301 extracts the group ID 3001 and the device ID list 3002 corresponding to the validity time-limit 3000 from the key information generation instruction storage unit 300, and deletes the validity time-limit 3000, the group ID 3001, and the device ID list 3002 from the key information generation instruction storage unit 300.

Then, the key information generation instruction unit 301 sets a new validity time-limit, and generates a key information re-generation instruction, which contains the new validity time-limit, the group ID 3001, and the device ID list 3002 extracted from the key information generation instruction storage unit 300. The key information generation instruction unit 301 then sends the newly generated key information re-generation instruction to the session management server 40 via the network IF unit 306. The key information generation instruction unit 301 stores the key information re-generation instruction into the key information generation instruction storage unit 300. Note that the key information re-generation instruction has substantially the same data configuration as the key information generation instruction 61 shown in FIG. 9, the difference being the message type 610.

When the key information deletion instruction unit 302 receives the group ID and the device ID from the group member determination unit 305, the key information deletion instruction unit 302 sends the logged-in device ID acquisition request containing the appropriate device ID to the database 20, to thereby acquire those device IDs which have been associated network addresses in the network address storage unit 21.

The key information deletion instruction unit 302 generates the key information deletion request containing the device ID acquired from the database 20, and sends the generated key information deletion request through the network IF unit 306 to the session management server 40. Then, the key information deletion instruction unit 302 deletes the group ID received from the group member determination unit 305, the validity time-limit stored in association with that group ID, and the device ID list, from the key information generation instruction storage unit 300.

Figure 13:
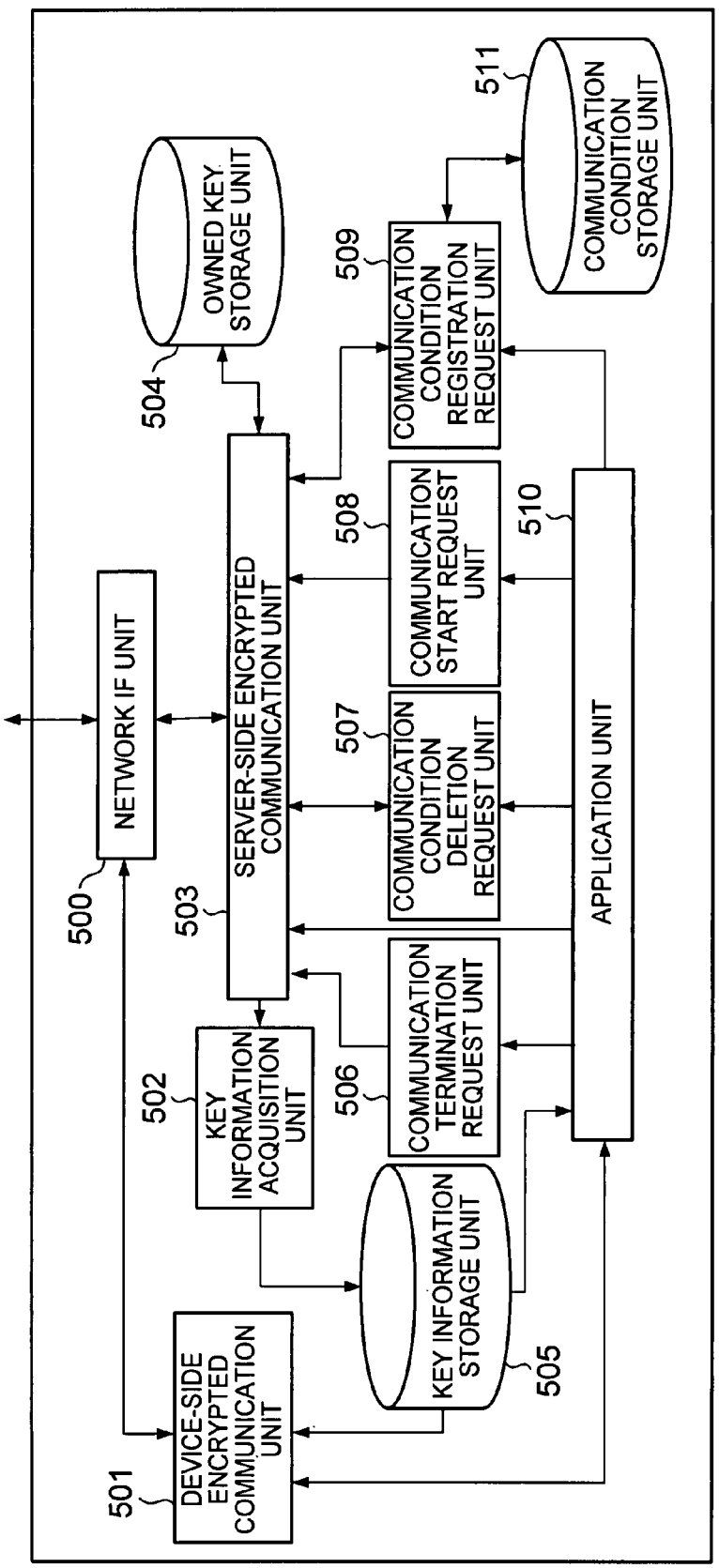
FIG. 13 is a block diagram showing an example of a detailed functional configuration of a communication device.

FIG. 13 is a block diagram showing an example of a detailed functional configuration of the communication device 50. The communication device 50 is provided with a network IF unit 500, a device-side encrypted communication unit 501, a key information acquisition unit 502, a server-side encrypted communication unit 503, an owned key storage unit 504, a key information storage unit 505, a communication termination request unit 506, a communication condition deletion request unit 507, a communication start request unit 508, a communication condition registration request unit 509, an application unit 510, and a communication condition storage unit 511.

The owned key storage unit 504 stores a secret key for its own communication device 50, and a public key certificate that forms a pair with the public key for the session management server 40 to verify the communication device 50. The server-side encrypted communication unit 503 receives the instruction from the application unit 510, and, via the network IF unit 500, uses the secret key and the public key certificate in the owned key storage unit 504, to perform sharing processing to share the key with the session management server 40. After that, the server-side encrypted communication unit 503 communicates with the session management server 40 by using the encryption key shared with the session management server 40.

Furthermore, the server-side encrypted communication unit 503 receives an instruction from the application unit 510, and sends an encrypted communication route deletion request to the session management server 40 via the network IF unit 500, to thereby destroy the encryption key shared with the session management server 40.

Figures 14, 15:
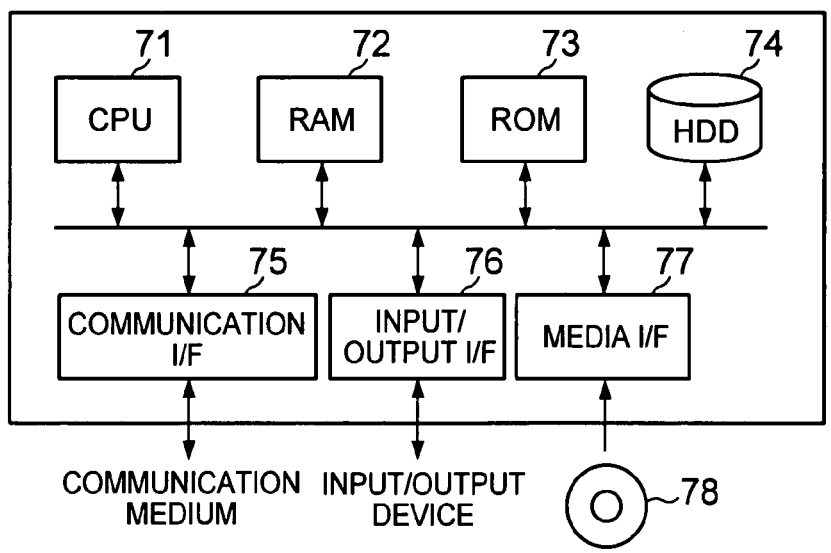
FIG. 14 is an explanatory diagram showing an example of a data configuration stored in a communication condition storage unit.
FIG. 15 is a hardware structural diagram showing an example of a hardware configuration of an information processing device which realizes a function of the database, the communication status management server, or the session management server.

The communication condition storage unit 511 has a data configuration, for example as shown in FIG. 14, and stores each of the one or more communication conditions according to a priority ranking 5113. Each of the communication conditions contains an encryption algorithm 5110 executable by its own communication device 50, a key length 5111 of the encryption key being used in the encrypted communication, a hash function type 5112, and the like.

The communication condition registration request unit 509 follows the instruction from the application unit 510, refers to the communication condition storage unit 511, generates the communication condition registration request 60 shown in FIG. 8, and sends the generated communication condition registration request 60 via the server-side encrypted communication unit 503 to the session management server 40.

The communication condition deletion request unit 507 follows the instruction from the application unit 510, and sends the communication condition deletion request containing the device ID of its own communication device 50 through the server-side encrypted communication unit 503 to the session management server 40.

The communication start request unit 508 follows the instruction from the application unit 510 and sends the communication start request containing device ID of its own communication device 50, and the group ID of the group conducting the encrypted communication, to the session management server 40 via the server-side encrypted communication unit 503.

The communication termination request unit 506 follows the instruction from the application unit 510 and sends the device ID of its own communication device 50, and the group ID of the group conducting the encrypted communication, to the session management server 40 via the server-side encrypted communication unit 503.

When the key information acquisition unit 502 receives the distributed key information 62 shown in FIG. 10 via the server-side encrypted communication unit 503, the key information acquisition unit 502 then stores the key information 621, the network address list 622, and the device ID list 623, contained in the distributed key information 62 received, into the key information storage unit 505. When packets are being sent and received by the application that conducts network communication in the group where the communication devices 50 are installed, the device-side encrypted communication unit 501 searches the key information storage unit 505, and determines whether or not the communication destinations of those packets are included among the network addresses 6220 or the group addresses 624 in the distributed key information 62 shown in FIG. 10. If the communication destinations of those packets are included among those, then the device-side encrypted communication unit 501 uses the key information 621 to conduct intra-group encrypted communication with the other communication devices 50.

Further, in a case where the key information 621, the network address list 622, and the device ID list 623 are already stored in the key information storage unit 505, when the key information acquisition unit 502 receives another distributed key information 62, the key information acquisition unit 502 uses the key information 621, the network address list 622, and the device ID list 623 from the distributed key information 62 to update the data in the key information storage unit 505.

Further, when the key information acquisition unit 502 receives the key information deletion request through the server-side encrypted communication unit 503, the key information acquisition unit 502 deletes the key information 621, the network address list 622, and the device ID list 623 that are stored in the key information storage unit 505, from the key information storage unit 505.

The application unit 510 can acquire the device ID and the network address information of those communication devices 50 that belong to the group and are logged in, from the key information storage unit 505. Therefore, the communication device 50 can recognize which of the other communication devices 50 within the group are participating in the intra-group encrypted communication currently being conducted.

FIG. 15 is a hardware structural diagram showing an example of a hardware configuration of an information processing device 70 for realizing the functions of the database 20, the communication status management server 30, or the session management server 40. The information processing device 70 is provided with a central processing unit (CPU) 71, a random access memory (RAM) 72, a read only memory (ROM) 73, a hard disk drive (HDD) 74, a communication interface 75, an input/output interface 76, and a media interface 77.

The CPU 71 operates based on a program stored in the ROM 73 and the HDD 74, to perform controls on the various units. The ROM 73 stores a boot program that the CPU 71 executes when the information processing device 70 boots up, and programs and the like which depend on the hardware of the information processing device 70.

The HDD 74 stores a program executed by the CPU 71, and data and the like used by the CPU 71. The communication interface 75 receives data from the other apparatuses via the management network 11 or the user network 12, and sends data generated by the CPU 71 to the other apparatuses via these networks.

The CPU 71 controls a keyboard, mouse, liquid crystal display (LCD) and other input/output devices, via the input/output interface 76. The CPU 71 obtains data from the keyboard, the mouse and the like, via the input/output interface 76. Furthermore, the CPU 71 outputs generated data to the LCD or the like, via the input/output interface 76.

The media interface 77 reads the program or data stored in the storage medium 78, and provides it to the RAM 72. The program provided to the CPU 71 via the RAM 72 is stored in the storage medium 78. The program is read out from the storage medium 78, installed into the information processing device 70 via the RAM 72, and is executed by the CPU 71.

In cases where the information processing device 70 functions as the database 20, the HDD 74 stores the data that is in the network address storage unit 21, the communication condition storage unit 22, the group member information storage unit 23, and the group address storage unit 24. The program that is installed and executed in the information processing device 70 causes the information processing device 70 to function as the network IF unit 25 and the database control unit 26.

Furthermore, in cases where the information processing device 70 functions as the communication status management server 30, the HDD 74 stores the data that is in the key information generation instruction storage unit 300, and the program that is installed and executed in the information processing device 70 causes the information processing device 70 to function as each of the key information generation instruction unit 301, the key information deletion instruction unit 302, the communication condition registration unit 303, the communication condition deletion unit 304, the group member determination unit 305, and the network IF unit 306.

Furthermore, in cases where the information processing device 70 functions as the session management server 40, the HDD 74 stores the data in the owned key storage unit 412, and the program that is installed and executed in the information processing device 70 causes the information processing device 70 to function as each of the network IF unit 400, the communication condition deletion request forwarding unit 401, the key information generation unit 402, the network address deletion unit 403, the network address registration unit 404, the communication condition registration request forwarding unit 405, the communication request forwarding unit 406, the key information deletion request sending unit 407, the encrypted communication unit 408, the device authentication unit 409, the network IF unit 410, and the key generation unit 411.

Examples of the storage medium 78 include an optical storage medium such as a Digital Versatile Disk (DVD) or a Phase change rewritable Disk (PD), a magneto-optical storage medium such as Magneto-Optical disk (MO), a tape medium, a magnetic storage medium, or a semiconductor memory. The information processing device 70 reads the programs from the storage medium 78 and executes the programs. As another example, those programs may be obtained from another device through a communication medium. The "communication medium" refers to the management network 11 or the user network 12, or a digital signal or transmission wave that propagates therethrough.

Figure 16:
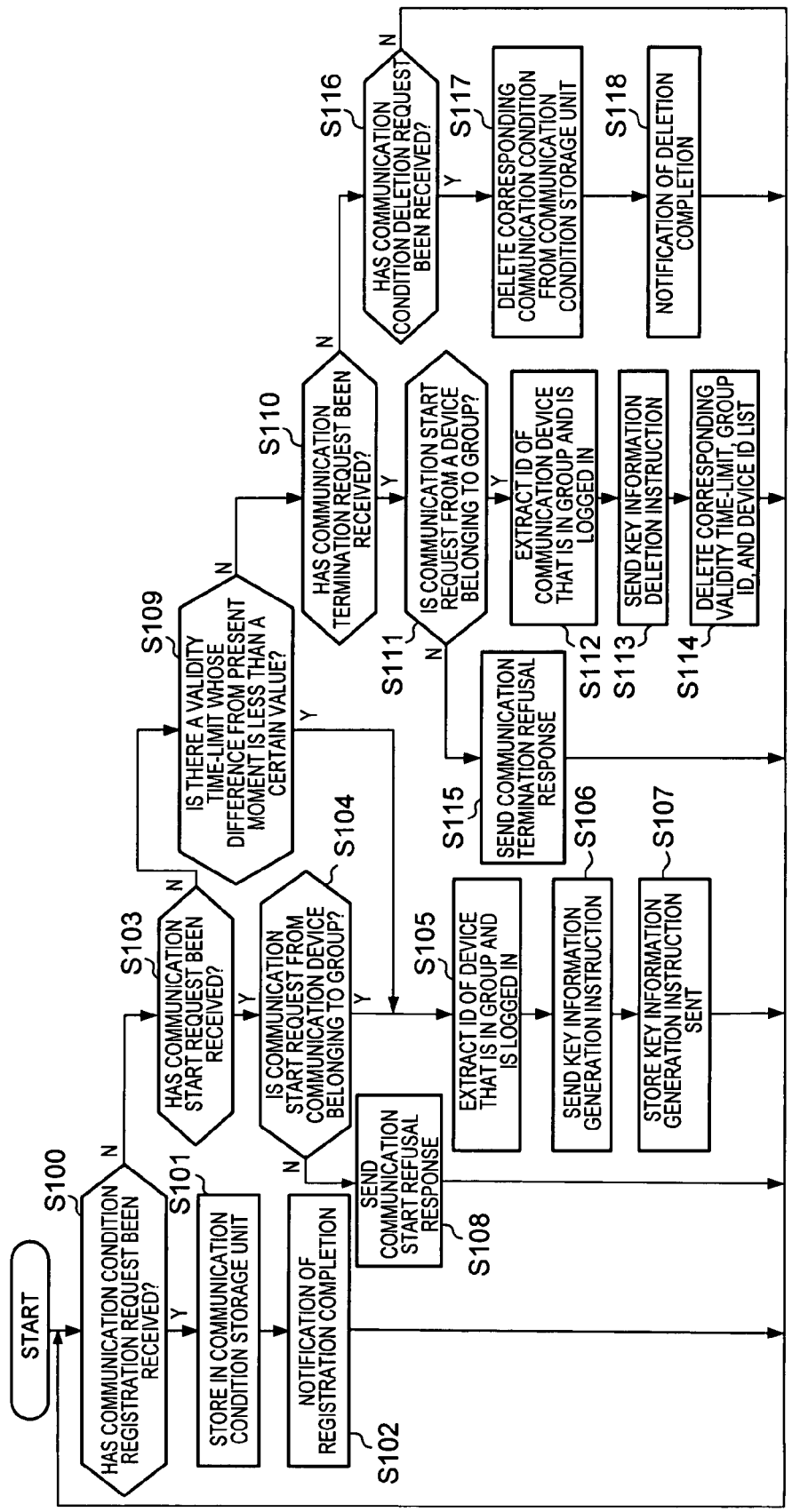
FIG. 16 is a flowchart showing an example of operations of the communication status management server.

In this case, FIG. 16 is used to provide a detailed explanation of one example of the operation of the communication status management server 30, in a case where the intra-group encrypted communication is realized. For example, at predetermined timing, such as when a power source is supplied, the communication status management server 30 starts the operations shown in this flowchart.

First, the communication condition registration unit 303 determines whether or not the communication condition registration request 60 shown in FIG. 8 has been received from the session management server 40 via the management network 11 (S100). If the communication condition registration request 60 has been received (S100: Yes), then the communication condition registration unit 303 sends to the database 20 the communication conditions and the device ID contained in the communication condition registration request 60, whereby those communication conditions are associated with the device ID and stored in the communication condition storage unit 22 (S101).

Then, the communication condition registration unit 303 receives a response from the database 20 indicating that the registration is complete; and sends to the session management server 40, via the management network 11, a registration completion notification which contains the device ID of the communication device 50 that has sent the communication condition registration request 60 (S102). The communication condition registration unit 303 executes again the processing of Step 100.

If the communication condition registration request 60 has not been received (S100: No), the group member determination unit 305 determines whether or not the communication start request has been received via the management network 11 (S103). If the communication start request has been received (S103: Yes), then the group member determination unit 305 sends the group member acquisition request containing that group ID to the database 20, whereby the device ID being stored in the group member information storage unit 23 in association with the group ID is acquired from the database 20. Then, based on the acquired device ID, the group member determination unit 305 determines whether or not the device ID contained in the communication start request is included among the acquired device IDs (S104).

If the device ID contained in the communication start request is included among the device IDs obtained from the database 20 (S104: Yes), then the group member determination unit 305 sends the group ID contained in the communication start request and the device ID acquired from the database 20, to the key information generation instruction unit 301.

Next, the key information generation instruction unit 301 sends the logged-in device ID acquisition request, which contains the device ID, to the database 20, and acquires those device IDs which are associated with the network addresses that are in the network address storage unit 21, whereby the device IDs of the communication devices 50 that are currently logged in are extracted from among the communication devices 50 that belong to the group corresponding to the received group ID (S105).

Next, the key information generation instruction unit 301 sets the validity time-limit for the key information to be generated. Then, the key information generation instruction unit 301 generates the key information generation instruction 61 shown in FIG. 9, and sends the generated key information generation instruction 61 to the session management server 40 via the network IF unit 306 (S106). The key information generation instruction unit 301 stores the sent key information generation instruction 61, into the key information generation instruction storage unit 300 (S107); and the communication condition registration unit 303 executes again the processing of Step 100.

If the device ID contained in the communication start request is not included among the device IDs acquired from the database 20 (S104: No), then the group member determination unit 305 sends the communication start refusal response containing the device ID to the session management server 40 via the network IF unit 306 (S108), and the communication condition registration unit 303 again executes the processing of Step 100.

In Step 103, if the communication start request has not been received (S103: No), then the key information generation instruction unit 301 determines whether or not there exists a validity time-limit that has not yet elapsed and whose difference from the present moment is equal to or less than a predetermined amount in the key information generation instruction storage unit 300 (S109). If a validity time-limit exists that has not yet elapsed and whose difference from the present moment is equal to or less than the predetermined amount in the key information generation instruction storage unit 300 (S109: Yes), then the key information generation instruction unit 301 executes the processing from Steps 105 to 107, whereby an instruction is given to the session management server 40 to re-distribute the key information. By performing this processing, the communication device 50 can receive the distribution of the key automatically, as the validity time-limit of the distributed key approaches its end.

In the case where there does not exist a validity time-limit which has not yet elapsed and whose difference from the present moment is equal to or less than the predetermined amount in the key information generation instruction storage unit 300 (S109: No), the group member determination unit 305 determines whether or not the communication termination request has been received (S110). If the communication termination request has been received (S110: Yes), then the group member determination unit 305 sends the group member acquisition request containing the group ID to the database 20, whereby the group member determination unit 305 acquires the device ID that is stored in the group member information storage unit 23 in association with the group ID. Then, the group member determination unit 305 determines, based on the acquired device ID, whether or not the device ID contained in the communication termination request is included among the acquired device IDs (S111).

If the device ID contained in the communication termination request is included among the device IDs obtained from the database 20 (S111: Yes), the group member determination unit 305 sends the group ID contained in the communication termination request, and the device ID acquired from the database 20 to the key information deletion instruction unit 302.

Next, the key information deletion instruction unit 302 sends the logged-in device ID acquisition request containing the device ID to the database 20, whereby the key information deletion instruction unit 302 acquires those device IDs that are associated with the network addresses in the network address storage unit 21. As a result, from among those communication devices 50 that belong to the group that corresponds to the group ID received from the group member determination unit 305, the key information deletion instruction unit 302 extracts the device IDs of the communication devices 50 that are currently logged in (S112). Then, the key information deletion instruction unit 302 generates the key information deletion request containing the extracted device IDs, and sends the generated key information deletion request to the session management server 40 via the network IF unit 306 (S113).

The key information deletion instruction unit 302 deletes the group ID received from the group member determination unit 305, and the validity time-limit and device ID list that are stored in association with the group ID, from the key information generation instruction storage unit 300 (S114), and the communication condition registration unit 303 executes again the processing of Step 1000.

If the device ID contained in the communication termination request is not included among the device IDs acquired from the database 20 (S111: No), the group member determination unit 305 sends a communication termination refusal response containing the device ID to the session management server 40 via the network IF unit 306 (S115), and the communication condition registration unit 303 executes again the processing of Step 100.

In Step 110, if the communication termination request has not been received (S110: No), then the communication condition deletion unit 304 determines whether or not the communication condition deletion request has been received from the session management server 40 via the management network 11 (S116). If the communication condition deletion request 60 has not been received (S116: No), then the communication condition registration unit 303 executes again the processing of Step 100.

If the communication condition deletion request has been received (S116: Yes), then the communication condition deletion unit 304 sends the device ID to the database 20, whereby the device ID and the communication conditions that are stored in association with the device ID are deleted from the communication condition storage unit 22 (S117). The communication condition deletion unit 304 receives from the database 20 a response indicating that the deletion is complete, and sends a deletion completion notification containing the device ID that corresponds to the deleted communication conditions, to the session management server 40 via the network IF unit 306 (S118), and the communication condition registration unit 303 executes again the processing of Step 100.

Next, FIG. 17 is used to explain an example of operations of the encrypted communication system 10, in the case where intra-group encrypted communication is conducted.

First, the encrypted communication system 10 processes the communication condition registration requests from each of the communication devices 50 that are participating in the intra-group encrypted communication, and then registers the network address and communication conditions of the communication devices 50 into the database 20 (S20). Then, by processing the communication start request from any of the communication devices 50 that are in the group and are logged in, the encrypted communication system 10 starts the intra-group encrypted communication in the group where the communication device 50 that sent the communication start request belongs (S30). The encrypted communication system 10, as time goes by, updates the key information used in the intra-group encrypted communication (S40).

Next, by processing the communication termination request from any of the communication devices 50 in the group that are logged in, the encrypted communication system 10 terminates the intra-group encrypted communication in the group to which the communication device 50 that sent the communication termination request belongs (S50). Then, in response to a communication condition deletion request from each of the communication devices 50 to stop participating in the intra-group encrypted communication, the encrypted communication system 10 deletes from the database 20 the network address and the communication conditions of the communication device 50, and deletes the encrypted communication route with respect to that communication device 50 in response to the encrypted communication route deletion request (S60).

Hereafter, explanation is given regarding the detailed operations of the encrypted communication system 10 at each of the steps shown in FIG. 17.

FIG. 18 is a sequence diagram showing one example of detailed operations of the encrypted communication system 10 during the login processing (S20).

First, the server-side encrypted communication unit 503 of the communication device 50 participating in the intra-group encrypted communication follows an instruction from the application unit 510 and uses the secret key stored in the owned key storage unit 504 to generate a digital signature for any freely chosen message, and sends the generated digital signature, together with the public key certificate that is stored in the owned key storage unit 504, to the session management server 40, thereby requesting the session management server 40 to establish an encrypted communication route between the communication device 50 and the session management server 40. The device authentication unit 409 of the session management server 40 verifies the communication device 50 by inspecting the public key certificate contained in the received encrypted communication route establishment request and the digital signature for the message contained in the encrypted communication route establishment request (S200).

If the authentication succeeds, the device authentication unit 409 causes the key generation unit 411 to generate the encryption key to use in the encrypted communication with the communication device 50 (S201). Then, the device authentication unit 409 uses the secret key of the session management server 40 that is stored in the owned key storage unit 412, to generate a digital signature for the encryption key that was generated by the key generation unit 411.

Then, the device authentication unit 409 uses the public key certificate of the communication device 50 that is contained in the encrypted communication route establishment request, to encode the encryption key that was generated by the key generation unit 411. The device authentication unit 409 then sends a response, which contains the encoded encryption key, the generated digital signature, and the public key certificate of the session management server 40 that is stored in the owned key storage unit 412, to the communication device 50 that originally sent the encrypted communication request (S202). The device authentication unit 409 sets the encryption key for the communication device 50 into the encrypted communication unit 408.

Next, the server-side encrypted communication unit 503 in the communication device 50 uses the public key that is stored in the owned key storage unit 504, to decode the encoded encryption key contained in the response received in Step 202, whereby the server-side encrypted communication unit 503 acquires the encryption key, and sets the acquired encryption key as the encryption key to be used in the encrypted communication with the session management server 40 (S203).

Next, the communication condition registration request unit 509 sends the communication condition registration request 60 shown in FIG. 8 to the session management server 40 (S204). The network address registration unit 404 sends a network address registration request, which includes the device ID and network address contained in the communication condition registration request 60, to the database 20 via the management network 11 (S205). Then, the database control unit 26 of the database 20 registers the network address, contained in the received network address registration request, into the network address storage unit 21 so that the network address is associated with the device ID contained in the network address registration request, and then sends a response showing that the registration is complete, to the network address registration unit 404 (S206). The communication condition registration request forwarding unit 405 forwards the communication condition registration request 60 to the communication status management server 30 via the management network 11 (S207).

Next, the communication condition registration unit 303 of the communication status management server 30 sends a communication condition registration instruction, which includes the device ID and communication conditions in the received communication condition registration request 60, to the database 20, via the management network 11 (S208). The database control unit 26 of the database 20 registers the communication conditions contained in the received communication condition registration instruction, in the communication condition storage unit 22 so that the communication condition is associated with the device ID contained in the communication condition registration instruction, and sends a response indicating that the registration is complete to the communication status management server 30 (S209). Then, the communication condition registration unit 303 notifies the session management server 40 that the registration is complete, via the management network 11 (S210). The communication condition registration request forwarding unit 405 forwards the received registration completion notification to the communication device 50 via the user network 12 (S211).

FIG. 19 is a sequence diagram showing one example of the detailed operations of the encrypted communication system 10, during the processing to start the intra-group encrypted communication (S30).

First, the communication start request unit 508 of the logged-in communication device 50-1, which is in the group, sends a communication start request to the session management server 40 via the user network 12 (S300). The communication request forwarding unit 406 forwards the communication start request received via the user network 12, to the communication status management server 30 via the management network 11 (S301).

The group member determination unit 305 sends a group member acquisition request, which contains the group ID contained in the received communication start request, to the database 20 (S302). Then, from the group member information storage unit 23, the database control unit 26 extracts the device ID of the communication device 50 that belongs to the group that corresponds to that group ID, and sends a response containing the extracted device ID to the communication status management server 30 (S303). The group member determination unit 305 determines whether or not the device ID that is stored in the communication start request is included among the device IDs obtained from the database 20 (S304).

Then, the key information generation instruction unit 301 sends a logged-in device ID acquisition request, which contains the device ID acquired in Step 303, to the database 20 (S305). From among the device IDs contained in the logged-in device ID acquisition request, the database control unit 26 extracts the device IDs that have their network addresses registered in the network address storage unit 21, and then sends a response containing the extracted device IDs to the communication status management server 30 (S306).

Next, the key information generation instruction unit 301 sets the validity time-limit for the key information to be generated. Then, the key information generation instruction unit 301 generates the key information generation instruction 61 shown in FIG. 9, and sends the generated key information generation instruction 61 through the management network 11 to the session management server 40 (S307). The key information generation unit 402 sends the database 20 the communication condition acquisition request, which contains multiple device IDs included in the key information generation instruction 61 (S308). Then, the database control unit 26 extracts from the communication condition storage unit 22 the communication conditions that correspond to the device ID contained in the communication condition acquisition request, and sends the session management server 40 a response containing the extracted communication conditions (S309). The key information generation unit 402 generates key information containing a key that can be executed according to the communication conditions that are common to the acquired communication conditions of the respective communication devices 50 (S310).

Next, the key information generation unit 402 generates the distributed key information 62 containing the generated key information, and sends the generated distributed key information 62 to each of the communication device 50-1, the communication device 50-2, and the communication device 50-3, which conduct intra-group encrypted communication (S311, S312, and S313). By doing this, the communication device 50-1, the communication device 50-2, and the communication device 50-3, which are conducting encrypted communication, each share the same distributed key information 62. The communication device 50-1, the communication device 50-2, and the communication device 50-3 each use the key contained in the received distributed key information 62 to perform the intra-group encrypted communication (S314). More specifically, when the packets are sent and received by the applications that are installed on the communication devices 50 and conduct network communication within the group, the device-side encrypted communication unit 501 searches the key information storage unit 505, and determines whether or not the destination of that packet is included among the network addresses 6220 of the distributed key information 62 shown in FIG. 10, or is included among the group addresses 624. If the destination of that packet is included therein, the key information is used to send and receive the encoded packets with the other communication devices 50.

FIG. 20 is a sequence diagram showing one example of detailed operations of the encrypted communication system 10 during the key information redistribution processing (S40).

If there exists in the key information generation instruction storage unit 300 a validity time-limit which has not elapsed yet and whose difference from the present moment is equal to or less than the predetermined amount, the key information generation instruction unit 301 sets a new validity time-limit and extracts the group ID corresponding to the validity time-limit and the device ID list from the key information generation instruction storage unit 300. Then, the key information generation instruction unit 301 generates a key information re-generation instruction, which contains the newly set validity time-limit and the group ID and device ID list that have been extracted from the key information generation instruction storage unit 300, and sends the generated key information re-generation instruction to the session management server 40 via the management network 11 (S400).

Next, the key information generation unit 402 sends the communication condition acquisition request, which includes the plurality of device IDs contained in the key information re-generation instruction, to the database 20 (S401). Then, the database control unit 26 extracts the communication conditions that correspond to the device ID contained in the communication condition acquisition request, from the communication condition storage unit 22, and sends a response containing the extracted communication condition to the session management server 40 (S402) Then, the key information generation unit 402 generates the key information, which includes a key that can be executed according to communication conditions that are common to the acquired communication conditions of each of the communication devices 50 (S403). Then, the key information generation unit 402 generates the distributed key information 62 containing the generated key information, and distributes, via the user network 12, the generated distributed key information 62 to each of the communication device 50-1, the communication device 50-2, and the communication device 50-3 that are conducting intra-group encrypted communication (S404, S405, and S406).

FIG. 21 is a sequence diagram showing one example of detailed operations of the encrypted communication system 10 during the intra-group encrypted communication termination processing (S50).

First, the communication termination request unit 506 of the communication device 50-1, which is conducting intra-group encrypted communication, sends a communication termination request to the session management server 40 via the user network 12 (S500). The communication request forwarding unit 406 forwards the communication termination request, which has been received via the user network 12, to the communication status management server 30 via the management network 11 (S501).

Next, the group member determination unit 305 sends the database 20 the group member acquisition request, which contains the group ID contained in the received communication termination request (S502). Then, the database control unit 26 extracts from the group member information storage unit 23 the device ID of the communication device 50 belonging to the group that corresponds to the group ID, and sends the communication status management server 30 a response containing the extracted device ID (S503). Then, the group member determination unit 305 determines whether or not the device ID that is stored in the communication termination request is included among the device IDs acquired from the database 20 (S504).

Then, the key information generation instruction unit 301 sends the database 20 the logged-in device ID acquisition request that contains the device ID acquired in Step 503 (S505). Then, the database control unit 26 extracts, from among those device IDs that are included in the logged-in device ID acquisition request, those with network addresses that are registered in the network address storage unit 21, and sends the communication status management server 30 a response containing the extracted device ID (S506).

Next, the key information deletion instruction unit 302 generates a key information deletion instruction containing the extracted device ID, and sends the generated key information deletion instruction to the session management server 40 via the management network 11 (S507). Then, the key information deletion request sending unit 407 sends the key information deletion request to each of the communication devices 50 specified by the multiple device IDs contained in the key information deletion instruction (S508, S509, and S510). The key information acquisition unit 502 in each of the communication device 50-1, the communication device 50-2, and the communication device 50-3 that have received the key information deletion request, deletes the key information which is stored in the key information storage unit 505 and corresponds to the key information deletion request.

Note that, the intra-group encrypted communication termination processing of FIG. 21 can be requested from somewhere other than the communication devices 50. For example, the administrator of the encrypted communication system 10 can also make a request from the communication status management server 30 to interrupt the intra-group encrypted communication. In this case, Steps S500 and S501 of FIG. 21 are omitted.

FIG. 22 is a sequence diagram showing one example of the detailed operations of the encrypted communication system 10 during the logout processing (S60).

First, the communication condition deletion request unit 507 of the communication device 50 sends the communication condition deletion request, which contains the device ID and network address of its own communication device 50, to the session management server 40 via the user network 12 (S600). The communication condition deletion request forwarding unit 401 of the session management server 40 forwards the received communication condition deletion request to the communication status management server 30 via the management network 11 (S601).

Next, the communication condition deletion unit 304 of the communication status management server 30 sends a communication condition deletion instruction, which contains the device ID contained in the communication condition deletion request that has been received, to the database 20 via the management network 11 (S602). Then, the database control unit 26 of the database 20 deletes, from the communication condition storage unit 22, the communication conditions that corresponds to the device ID contained in the communication condition deletion instruction that has been received, and then sends the communication status management server 30 a response indicating that the communication condition has been deleted (S603). Then, the communication condition deletion unit 304 sends the session management server 40 a deletion completion notification, which contains the device ID that corresponds to the deleted communication conditions (S604).

Next, the network address deletion unit 403 of the session management server 40 sends a network address deletion request, which contains the network address included in the communication condition deletion request, to the database 20 via the management network 11 (S605). The database control unit 26 of the database 20 deletes the network address contained in the received network address deletion request, from the network address storage unit 21, and sends the communication status management server 30 a response indicating that the network address has been deleted (S606). Then, the network address deletion unit 403 sends the deletion completion notification to the communication device 50 that has sent the communication condition deletion request (S607).

Next, the server-side encrypted communication unit 503 sends an encrypted communication route deletion request to the session management server 40 via the user network 12 (S608). The device authentication unit 409 of the session management server 40 sends a response to the encrypted communication route deletion request to the communication device 50 that has sent the encrypted communication route deletion request (S609). Then, the communication device 50 destroys the encryption key shared with the session management server 40 (S610), and the session management server 40 destroys the encryption key shared with the encrypted communication 50 (S611).

As is clear from the foregoing explanations, the encrypted communication system 10 of this embodiment can reduce the traffic generated by distributing the key and the settings information used in the intra-group encrypted communication. Furthermore, the information relating to those communication devices 50 that belong to the group and are currently logged on is distributed along with the key information that is used in the intra-group encrypted communication. Therefore, each of the communication devices 50 is able to recognize the other communication devices 50 that are participating in the intra-group encrypted communication.

Note that the present invention is not limited to the embodiments described above, and various modifications are possible within the scope of the gist of the invention.

For example, in the aforementioned embodiment, after the encryption key is shared between the session management server 40 and the communication device 50, the session management server 40 registers the network address of the communication device 50 in the network address storage unit 21 of the database 20, and also registers the communication conditions of the communication device 50 in the communication condition storage unit 22 of the database 20. This is given as one example of "logging in", but the present invention is not limited to this.

"Logging in" may refer to the communication device 50 joining into the intra-group encrypted communication service provided by the encrypted communication system 10. For example, being "logged in" may be defined as the session management server 40 registering the network address of the communication device 50 in the network address storage unit 21 of the database 20, or as the session management server 40 registering the communication conditions of the communication device 50 in the communication condition storage unit 22 of the database 20 via the communication status management server 30.

Furthermore, in the aforementioned embodiment, the database 20, the communication status management server 30, and the session management server 40 are each explained as independent devices, but the present invention is not limited thereto. The database 20, the communication status management server 30, and the session management server 40 may be realized within a single device. Each of the functions within each of the database 20, the communication status management server 30, and the session management server 40 may also be realized by being distributed across two or more devices.

Furthermore, in the aforementioned embodiment, the network address is explained using Internet Protocol Version 4 (IPv4) as an example, but the present invention is not limited thereto. The present invention may be similarly applied in Internet Protocol Version 6 (IPv6) as well. For example, the multicast address according to the aforementioned embodiment that is explained using IPv4 as an example, can be applied similarly to the any cast address in IPv6.

Furthermore, in the aforementioned embodiment, upon reception of the communication start request, based on the group ID contained in the communication start request, the communication status management server 30 refers to the group member information storage unit 23 in the database 20, to acquire the device ID of the communication device 50 belonging to the group. However, the present invention is not limited thereto.

For example, when the communication status management server 30 receives the communication start request which contains the network address of the network conducting intra-group encrypted communication, an indication to perform the intra-group encrypted communication by means of a broadcast, and the device ID of the communication device 50 that is a transmission source of the communication start request, the communication status management server 30 may extract the device ID of the communication device 50 belonging to the network address from the network address storage unit 21 of the database 20, thereby extracting the device ID of the communication device 50 that is a target of the encrypted communication.

Furthermore, the aforementioned embodiment is explained by using an example in which the encrypted communication system 10 manages the group conducting encrypted communication by using the group ID, and the group ID of the group conducting the encrypted communication is set in advance into each of the communication devices 50. However, the present invention is not limited thereto.

For example, when a name-resolving server connected to the management network 11 and the user network 12 is provided, and a group ID acquisition request containing the device IDs of multiple communication devices 50 is received from the communication device 50 via the user network 12, the name-resolving server may refer to the group member information storage unit 23 of the database 20 via the management network 11, thereby acquiring the corresponding group ID, and the group ID thus acquired may be sent to the communication device 50 which has sent the group ID acquisition request.

Note that, upon reception of the group ID acquisition request containing the network address of the multiple communication devices 50 from the communication device 50 via the user network 12, the aforementioned name-resolving server refers to the network address storage unit 21 and the group member information storage unit 23 of the database 20 via the management network 11, thereby acquiring the corresponding group ID, and sending the acquired group ID to the communication device 50 which has sent the group ID acquisition request.

Furthermore, when the aforementioned name-resolving server receives the group ID acquisition request containing the group address (e.g., multicast address or broadcast address) from the communication device 50 via the user network 12, the name-resolving server refers to the group address storage unit 24 of the database 20 via the management network 11, thereby acquiring the corresponding group ID, and sends the acquired group ID to the communication device 50 that has sent the group ID acquisition request.

Thus, each of the communication devices 50 can acquire the group ID of the group conducting the intra-group encrypted communication, by making an inquiry to the name-resolving server via the user network 12, by means of the device IDs or network addresses of the multiple communication devices 50 conducting intra-group encrypted communication. This eliminates the need for each of the communication devices 50 to store the group ID in advance. Moreover, the encrypted communication system 10 can integrate the management of the communication devices 50 belonging to each of the groups, from the group member information storage unit 23 of the database 20. Thus, the addition and deletion of communication devices 50 within the group can be performed more flexibly.

Note that the effect of the present invention can also be obtained if the aforementioned name-resolving server includes the group member information storage unit 23 provided separately from the group member information storage unit 23 that is in the database 20, and when, in response to the group ID acquisition request from the communication device 50, the name-resolving server refers to the group member information storage unit 23 stored therein and sends back the corresponding group ID.

Furthermore, in the aforementioned embodiment, the session management server 40 distributes the key information, which is generated in response to the instruction from the communication status management server 30, to the communication devices 50 that belong to the group using the key information to conduct intra-group encrypted communication, and that are also currently logged in. However, the present invention is not limited thereto. For example, in Step 307 of FIG. 19, when the key information generation instruction 61 is received from the communication status management server 30, the key information generation unit 402 of the session management server 40 may make an inquiry to the communication device 50 corresponding to each device ID 6630 contained in the device ID list 613 in the key information generation instruction 61, about whether or not each of the communication device 50 is participating in the current intra-group encrypted communication.

In this case, for each communication device 50 from which the answer indicating the participation has been received, the key information generation unit 402 generates the key information based on the communication condition acquired from the communication condition storage unit 22, and generates the distributed key information 62 that contains the generated key information and also contains the device ID list and the network address list of the communication device 50 from which the response indicating the participation has been received. Then, the key information generation unit 402 sends the generated distributed key information 62 to each of the communication devices 50 that have sent the responses indicating participation. Thus, the encrypted communication system 10 further reduces the traffic generated by distributing the key information.

Furthermore, even in a case where the key information generation unit 402 receives the key information redistribution instruction, the key information generation unit 402 may make an inquiry to the communication device 50 corresponding to the device ID contained in the device ID list in the key information redistribution instruction, about whether or not each communication device 50 is continuing to participate in the intra-group encrypted communication.

What is claimed is:

1. An encrypted communication system which uses key information generated by a session management server to achieve intra-group encrypted communication within any of a plurality of groups, respectively including a plurality of communication devices, the encrypted communication system comprising:

a database which stores information relating to each of the communication devices; and a communication status management server which manages the intra-group encrypted communication performed by the communication devices, wherein:

the database includes:

a participating device address storage unit which stores a network address of each participating device that is currently logged in, from among communication devices belonging to any of the plurality of groups, so that the network address is associated with a device ID which identifies the communication device; and a group member information storage unit which stores the device ID of each of the communication devices, so that the device ID is associated with a group ID which identifies the group to which the communication devices belong; and the communication status management server includes:

a group member extraction unit which, on receiving an intra-group encrypted communication request, refers to the group member information storage unit, and extracts device IDs of the communication devices belonging to a group corresponding to the group ID which is included in the intra-group encrypted communication request; and a participating device ID extraction unit which refers to the participating device address storage unit, extracts, from among the device IDs extracted by the group member extraction unit, a device ID of a participating device that belongs to a group corresponding to the group ID contained within the intra-group encrypted communication request, and that is currently logged in and outputs the device ID to the session management server, to thereby cause the session management server to distribute the key information for use in the intra-group encrypted communication within the group, to only participating devices that are currently logged in.

2. An encrypted communication system according to claim 1, further comprising the session management server, wherein the session management server includes a participating device registration unit which, on receiving from the communication device notification of participation in the intra-group encrypted communication, stores a network address of the communication device that is currently logged in into the participating device address storage unit, as a network address of a participating device, so that the network address is associated with the device ID.

3. An encrypted communication system according to claim 2 wherein:

the session management server further includes an encrypted communication unit which establishes an encrypted communication route with respect to the communication device, and sends and receives data to and from the communication device via the established encrypted communication route;

the group member extraction unit receives the intra-group encrypted communication request from the communication device via the encrypted communication route;

the database further includes a communication condition storage unit which stores, in association with the device ID, at least one communication condition that can be executed by a corresponding communication device under which each communication device can execute the intra-group encrypted communication; and the session management server further includes a key generation and distribution unit which receives the device IDs outputted from the participating device ID extraction means, extracts, from the communication condition storage unit, the communication conditions in association with each of the received device IDs, extracts, from the extracted communication conditions, a common communication condition that is associated with the plurality of device IDs, generates key information which is used for performing the intra-group encrypted communication executable under the extracted communication condition, and sends the generated key information to each communication device corresponding to each of the device IDs received from the participating device ID extraction unit, via the encrypted communication route.

4. An encrypted communication system according to claim 3, wherein the key information generation and distribution unit further distributes the generated key information and a list of the device IDs received from the participating device ID extraction unit, to each of the communication devices which correspond to the device IDs.

5. An encrypted communication system according to claim 3, wherein:

the database further includes a group address storage unit which stores a group address, which is a multicast address or broadcast address for a group, so that the group address is associated with a group ID of the group;

the group member extraction unit, on receiving the intra-group encrypted communication request, refers to the group address storage unit based on the group ID contained in the intra-group encrypted communication request, and further extracts the group address corresponding to the group ID;

the participating device ID extraction unit further outputs the extracted device ID and the group address extracted by the group member extraction unit; and the key generation unit sends the generated key information and the group address received from the participating device ID extraction unit, to each of the corresponding communication devices, via the encrypted communication route.

6. An encrypted communication system according to claim 1, wherein:

the intra-group encrypted communication request further includes a device ID of the communication device from which the intra-group encrypted communication request is sent; and the group member extraction unit refers to the group member information storage unit, and extracts, if the device ID included in the intra-group encrypted communication request is included in the device IDs of the communication devices belonging to the group corresponding to the group ID included in the received intra-group encrypted communication request, the device IDs of the communication devices belonging to the group corresponding to the group ID.

7. An encrypted communication system which achieves intra-group encrypted communication, being encrypted communication within any of a plurality of groups, respectively including a plurality of communication devices, comprising:

a database which stores information relating to each of the communication devices;

a communication status management server which manages the intra-group encrypted communication performed by the plurality of communication devices;

a session management server which generates key information for use in the intra-group encrypted communication, and distributes the key information to each of the communication devices; and a plurality of communication devices, wherein:

the database includes:

a participating device address storage unit which stores a network address of each participating device that is currently logged in, from among communication devices belonging to any of the plurality of groups, so that the network address is associated with a device ID which identifies the communication device;

a group member information storage unit which stores the device IDs of each of the plurality of communication devices, so that the device IDs are associated with a group ID which identifies the group to which the communication devices belong; and a communication condition storage unit which stores at least one communication condition executable by each of the communication devices in the intra-group encrypted communication, so that the communication conditions are associated with the device ID;

the communication status management server includes:

a group member extraction unit which, on receiving an intra-group encrypted communication request via the session management server, refers to the group member information storage unit, and extracts the device IDs of communication devices belonging to the group corresponding to the group ID which is included in the intra-group encrypted communication request; and a participating device ID extraction unit which refers to the participating device address storage unit, extracts, from among the device IDs extracted by the group member extraction unit, a device ID of a participating device that belongs to a group corresponding to the group ID contained within the intra-group encrypted communication request, and that is currently logged in and outputs the device ID to the session management server;

the session management server includes:

a server-side encrypted communication unit which establishes an encrypted communication route with respect to the communication device, and sends and receives data to and from the communication device via the established encrypted communication route;

a participating device registration unit which, on receiving notification of participation in the intra-group encrypted communication, from the communication device via the encrypted communication route, stores a network address of the communication device that currently logged in into the participating device address storage means, as a network address of a participating device, so that the network address is associated with the device ID; and a key generation and distribution unit which receives the device IDs outputted from the participating device ID extraction unit, extracts, from the communication condition storage unit, the communication conditions associated with each of the device IDs, extracts, from the extracted communication conditions, a common communication condition that is associated with the plurality of device IDs, generates key information which is used for performing the intra-group encrypted communication executable under the extracted communication condition, and distributes the key information for use in the intra-group encrypted communication within the group, to only participating devices that are logged in; and each of the plurality of communication devices includes:

a communication device side encrypted communication unit which establishes an encrypted communication route with respect to the session management server, and sends and receives data to and from the session management server via the established encrypted communication route;

an encrypted communication request unit which transmits, in a case where the intra-group encrypted communication is initiated, the intra-group encrypted communication request, to the session management server via the encrypted communication route; and an intra-group encrypted communication unit which, in a case where the key information is received from the session management server via the encrypted communication route in response to the intra-group encrypted communication request, uses the key information to execute intra-group encrypted communication with another communication device in the group.

8. A communication status management server which instructs a session management server to use information stored in a storage device to distribute key information, in an encrypted communication system which uses key information generated by the session management server to achieve intra-group encrypted communication within any of a plurality of groups, respectively including a plurality of communication devices, the communication status management server being implemented with a processor and a memory having instructions, execution of instructions causing the communication status management server to include:

a group member extraction unit which, on receiving an intra-group encrypted communication request, refers to the storage device, and extracts the device IDs of the communication devices belonging to the group that corresponds to the group ID which is included in the intra-group encrypted communication request, from the group member information storage unit of the storage device, in which the device IDs of each of the plurality of communication devices are stored in association with a group ID which distinguishes the group to which the communication devices belong; and a participating device ID extraction unit which refers to the participating device address storage unit of the storage device, in which the network addresses of each of the participating devices that are currently logged in, from among communication devices belonging to any of the plurality of groups, are stored in association with a device ID which distinguishes the communication device, extracts, from among the device IDs extracted by the group member extraction unit, a device ID of a participating device that belongs to a group corresponding to the group ID contained within the intra-group encrypted communication request, and that is currently logged in and outputs the device ID to the session management server, to thereby cause the session management server to distribute the key information for use in the intra-group encrypted communication within the group, to only participating devices within the group corresponding to the group ID that are currently logged in.

9. An encrypted communication method in an encrypted communication system which uses key information generated by a session management server to achieve intra-group encrypted communication within any of a plurality of groups, respectively including a plurality of communication devices, wherein:

the encrypted communication system includes:

a database which stores information relating to each of the communication devices; and a communication status management server which manages the intra-group encrypted communication performed by the plurality of communication devices;

the database includes:

a participating device address storage unit which stores a network address of each participating device that is currently logged in, from among communication devices belonging to any of the plurality of groups, so that the network address is associated with a device ID which identifies each communication device; and a group member information storage unit which stores the device ID of each of the plurality of communication devices, so that the device ID is associated with a group ID which identifies a group to which the communication devices belong; and wherein the method, performed by the communication status management server, comprises:

a group member extraction step of, on receiving an intra-group encrypted communication request, referring to the group member information storage unit, and extracting device IDs of the communication devices belonging to a group corresponding to the group ID which is included in the intra-group encrypted communication request; and a participating device ID extraction step of referring to the participating device address storage unit, extracting, from among the device IDs extracted in the group member extraction step, a device ID of a participating device that belongs to a group corresponding to the group ID contained within the intra-group encrypted communication request, and that is currently logged in and outputting the device ID to the session management server, so as to generate and distribute the key information for use in the intra-group encrypted communication within the group, to only participating devices that are currently logged in.

10. An encrypted communication method for an encrypted communication system which achieves intra-group encrypted communication, being encrypted communication within any of a plurality of groups, respectively including a plurality of communication devices, wherein:

the encrypted communication system includes:

a database which stores information relating to each of the communication devices;

a communication status management server which manages the intra-group encrypted communication performed by the plurality of communication devices;

a session management server which generates key information for use in the intra-group encrypted communication, and distributes the key information to each of the communication devices; and a plurality of communication devices;

the database includes:

a participating device address storage unit which stores a network address of each participating device, that is currently logged in, from among communication devices belonging to any of the plurality of groups, so that the network address is associated with a device ID which identifies the communication device;

a group member information storage unit which stores the device IDs of each of the plurality of communication devices, so that the device IDs are associated with a group ID which identifies the group to which the communication devices belong; and communication condition storages unit which stores at least one communication condition executable by each of the communication devices in the intra-group encrypted communication, so that the communication condition is associated with the device ID;

wherein the method, performed by communication status management server, comprises:

a group member extraction step of, on receiving an intra-group encrypted communication request via the session management server, referring to the group member information storage unit, and extracting the device IDs of communication devices belonging to the group corresponding to the group ID which is included in the intra-group encrypted communication request; and a participating device ID extraction step of referring to the participating device address storage unit, extracting, from among the device IDs extracted in the group member extraction step, a device ID of a participating device that belongs to a group corresponding to the group ID contained within the intra-group encrypted communication request, and that is currently logged in, and outputting the device ID to the session management server;

the method, performed by the session management server, comprises:

a server-side encrypted communication step of establishing an encrypted communication route with respect to the communication device, and sending and receiving data to and from the communication device via the established encrypted communication route;

a participating device registration step of, on receiving notification of participation in the intra-group encrypted communication, from the communication device via the encrypted communication route, storing a network address of the communication device into the participating device address storage unit as a network address of a participating device that is currently logged in, so that the network address is associated with the device ID; and a key generation and distribution step of receiving the device IDs outputted in the participating device ID extraction step, extracting, from the communication condition storage unit, the communication conditions associated with each of the device IDs, extracting, from the extracted communication conditions, a common communication condition that is associated with the plurality of device IDs, generating key information which is used for performing the intra-group encrypted communication executable under the extracted communication condition, and distributing the key information for use in the intra-group encrypted communication within the group, to only participating devices that are logged in; and and the method, performed by each of the plurality of communication devices, comprises:

a communication device side encrypted communication step of establishing an encrypted communication route with respect to the session management server, and sending and receiving data to and from the session management server via the established encrypted communication route;

an encrypted communication request step of transmitting, in a case where the intra-group encrypted communication is initiated, an intra-group encrypted communication request, to the session management server via the encrypted communication route; and an intra-group encrypted communication step of using, in a case where the key information is received from the session management server via the encrypted communication route in response to the intra-group encrypted communication request, the key information to execute intra-group encrypted communication with another communication device in the group.

11. A communication status management method for a communication status management server which instructs a session management server to use information stored in a storage device to generate key information, in an encrypted communication system which uses key information generated by the session management server to achieve intra-group encrypted communication within any of a plurality of groups, respectively including a plurality of communication devices, the method, performed by the communication status management server, comprises:

a group member extraction step of, on receiving an intra-group encrypted communication request, referring to the storage device based on the group ID, and extracting the device IDs of the communication devices belonging to the group that corresponds to the group ID which is included in the intra-group encrypted communication request, from the group member information storage unit of the storage device, in which the device IDs of each of the plurality of communication devices are stored in association with a group ID which distinguishes the group to which the communication devices belong; and a participating device ID extraction step of referring to the participating device address storage unit of the storage device, that is currently logged in, from among communication devices belonging to any of the plurality of groups, which are communication devices participating in the intra-group encrypted communication, are stored in association with a device ID which distinguishes the communication device, extracting, from among the device IDs extracted in the group member extraction step, a device ID of a participating device that belongs to a group corresponding to the group ID contained within the intra-group encrypted communication request, and that is currently logged in, and outputting the device ID to the session management server, to thereby cause the session management server to distribute the key information for use in the intra-group encrypted communication within the group, to only participating devices that are currently logged in.

12. An encrypted communication system which manages intra-group encrypted communication conducted within any of a plurality of groups respectively including a plurality of communication devices, the encrypted communication system comprising:

a database which stores a list of the plurality of communication devices belonging to each group, information of the participating devices that are currently logged in;

a participating device identification unit which refers to two entries of the database to identify, from among the communication devices belonging to either of two groups, the communication devices that are currently logged in; and a key distribution unit which generates a key for the encrypted communication performed by the identified communication devices, and distributes the key to only the communication devices that are currently logged in.

* * * * *